United States Patent [19]

Niwa et al.

[11] Patent Number: 4,626,590
[45] Date of Patent: Dec. 2, 1986

[54] REACTIVE MONOAZO AND DISAZO PYRIDONE DYESTUFFS CONTAINING A HALO-SUBSTITUTED 6-MEMBER NITROGEN-CONTAINING HETEROCYCLIC RING

[75] Inventors: Toshio Niwa, Yokohama; Kiyoshi Himeno, Kitakyushu; Toshio Hihara; Yukiharu Shimizu, both of Yokohama, all of Japan

[73] Assignee: Mitsubishi Chemical Industries Limited, Tokyo, Japan

[21] Appl. No.: 668,739

[22] Filed: Nov. 6, 1984

[30] Foreign Application Priority Data

Nov. 22, 1983 [JP] Japan .................. 58-220301
May 29, 1984 [JP] Japan .................. 59-108949
Jul. 27, 1984 [JP] Japan .................. 59-157043
Jul. 27, 1984 [JP] Japan .................. 59-157044
Aug. 13, 1984 [JP] Japan .................. 59-169000

[51] Int. Cl.[4] .................. C09B 62/085; C09B 62/09; C09B 62/245; C09B 62/25
[52] U.S. Cl. .................. 534/635; 534/596; 534/598; 534/649; 534/773
[58] Field of Search .............. 534/625, 627, 628, 638, 534/637, 635

[56] References Cited

U.S. PATENT DOCUMENTS 3,120,507  2/1964  Andrew et al. .................. 534/627 X
3,218,310  11/1965  Benz et al. .................. 534/626 X
3,418,308  12/1968  Ischer et al. .................. 534/626 X
4,017,477  4/1977  Hegar et al. .................. 534/627 X Primary Examiner—Floyd D. Higel
Attorney, Agent, or Firm—Jordan B. Bierman

[57] ABSTRACT

Reactive pyridone azo dyestuffs of the general formula [I]:

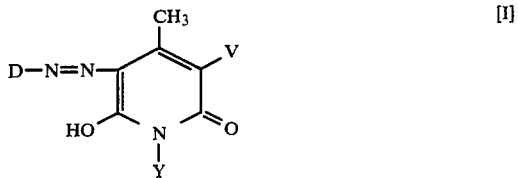

wherein
D represents

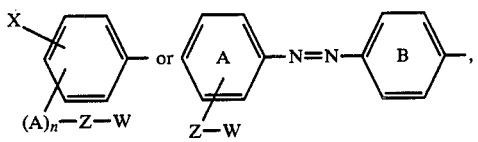

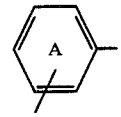

represents phenylene optionally substituted by lower alkyl, lower alkoxy, trifluoromethyl or halogen,

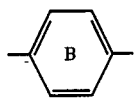

represents phenylene optionally substituted by lower alkyl, lower alkoxy, halogen or acetylamino, —A— represents —$CH_2$—, —$C_2H_4$—, —$OC_2H_4$—,

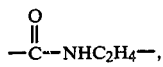

—$SO_2NHC_2H_4$— or —$SO_2C_2H_4$—, —X represents hydrogen, lower alkyl, lower alkoxy, nitro, trifluoromethyl or halogen,
—Y represents alkyl, aryl or aralkyl optionally substituted by lower alkoxy or phenoxy,
—Z— represents a connecting group of —O— or —S—,
—V represents —CN or —$CONH_2$,
—W represents a 6-membered nitrogen-containing heterocyclic ring having at least one active halogen atom, and
n represents 0 or 1.

These reactive pyridone azo distuffs give dyeings which are yellowish to reddish orange in color which have excellent light fastness.

8 Claims, No Drawings

REACTIVE MONOAZO AND DISAZO PYRIDONE DYESTUFFS CONTAINING A HALO-SUBSTITUTED 6-MEMBER NITROGEN-CONTAINING HETEROCYCLIC RING

BACKGROUND OF THE INVENTION

1. Field of the Invention

This invention relates to reactive pyridone azo dyestuffs, and more specifically it relates to reactive pyridone monoazo and disazo dyestuffs containing a specific reactive group and a specific disperse group in the molecular structure.

2. Description of the Prior Art

Heretofore, reactive dyestuffs etc. have been employed for dyeing natural fibers such as cotton etc. while disperse dyestuffs have mainly been used for dyeing polyester fibers etc.

Recently, there has been an increased demand for mixed fibers comprising natural fibers such as cotton etc. and synthetic fibers such as polyester etc., and in order to dye such mixed fibers with a single dyestuff and even by a single dyeing step, reactive disperse dyestuffs were proposed. Especially, a reactive pyridone monoazo dyestuff having the following structure was proposed as a reactive disperse dyestuff which can dye mixed fibers in a yellow color having washing fastness (Japanese Patent Application Laid-open No. 151064/1980, DE No. 2918881 and EPC No. 19728).

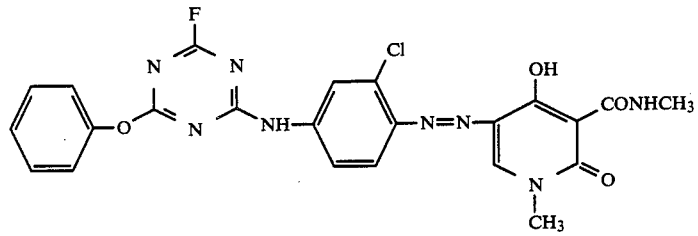

However, its light fastness was not adequate, and thus further improvement has been sought.

SUMMARY OF THE INVENTION

An object of this invention is to provide reactive pyridone azo dyestuffs which dye cellulose fibers, wool fibers, synthetic polyamide fibers, and mixed fibers comprising cellulose fibers and polyester fibers and mixed fibers comprising wool fibers and polyester fibers or polyamide fibers and polyester fibers in yellow to reddish orange colors having excellent light fastness.

Accordingly, the gist of this invention resides in reactive pyridone azo dyestuffs of the general formula [I]:

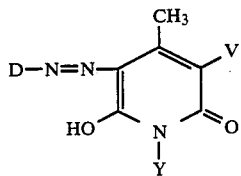     [I]

wherein
D— represents

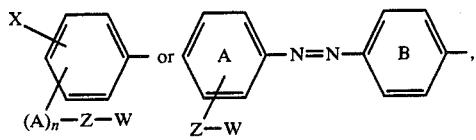

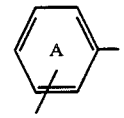

represents phenylene optionally substituted by lower alkyl, lower alkoxy, trifluoromethyl or halogen,

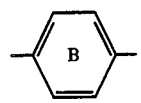

represents phenylene optionally substituted by lower alkyl, lower alkoxy, halogen or acetylamino,
—A— represents —CH$_2$—, —C$_2$H$_4$—, —OC$_2$H$_4$—,

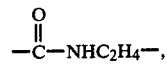

—SO$_2$NHC$_2$H$_4$— or —SO$_2$C$_2$H$_4$—,
—X represents hydrogen, lower alkyl, lower alkoxy, nitro, trifluoromethyl or halogen,
—Y represents alkyl, aryl or aralkyl optionally substituted by lower alkoxy or phenoxy,
—Z— represents a connecting group of —O— or —S—,
—V represents —CN or —CONH$_2$,
—W represents a 6-membered nitrogen-containing heterocyclic ring having at least one active halogen atom, and
n represents 0 or 1.

DETAILED DESCRIPTION OF THE INVENTION

In the aforesaid general formula [I] of this invention, examples of the lower alkyl as substituents for

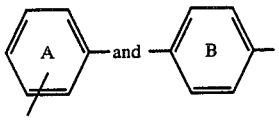

include methyl, ethyl, straight-chain or branched-chain propyl, butyl etc., examples of the lower alkoxy include methoxy, ethoxy, n-propoxy, iso-propoxy, n-butoxy etc., and examples of the halogen include fluorine, chlorine and bromine, chlorine being preferred.

In the aforesaid general formula [I], examples of the lower alkyl represented by —X include methyl, ethyl, straight-chain or branched-chain propyl, butyl etc.; examples of the lower alkoxy include methoxy, ethoxy, n-propoxy, iso-propoxy, n-butoxy etc.; and examples of the halogen include fluorine, chlorine and bromine, chlorine being preferred.

Examples of the unsubstituted alkyl represented by —Y include methyl, ethyl and straight-chain or branched-chain alkyl of 3–18 carbon atoms; examples of the lower alkyl substituted by lower alkoxy include lower alkoxyalkyl such as methoxyethyl, ethoxyethyl, butoxyethyl etc., lower alkoxyalkoxyalkyl such as methoxyethoxyethyl, ethoxyethoxyethyl, butoxyethoxyethyl etc.; examples of the lower alkyl substituted by phenoxy include phenoxyalkyl such as phenoxyethyl etc.; examples of the aryl include phenyl, naphthyl, o-tolyl, p-butylphenyl etc.; and examples of the substituted or unsubstituted aralkyl include benzyl, phenetyl, chlorobenzyl, methoxybenzyl etc.

Examples of the 6-membered nitrogen-containing heterocyclic ring having at least one active halogen atom represented by —W include a triazine ring of the following general formula [IX]:

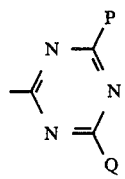

wherein —P represents fluorine, chlorine or bromine, —Q represents —P,

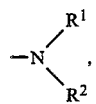

methyl, ethyl, phenyl, —O—R³ or —S—R³, —R¹ and —R² each represents hydrogen, or alkyl, alkenyl, cyclohexyl, aryl or aralkyl optionally substituted by cyano, hydroxy, lower alkoxy or dialkylamino, or —NR¹R² may represent a 5- or 6-membered nitrogen-containing heterocyclic ring formed by combining —R¹ and —R², said nitrogen-containing heterocyclic ring being able to contain a thioether bond, the total carbon atoms present in —R¹ and —R² being up to 18, and —R³ represents methyl, ethyl, ethoxyethoxy, phenyl etc.; a pyrimidine ring of the following general formula:

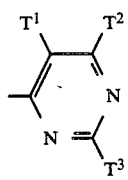

wherein —T¹, —T² and —T³ each represents the aforesaid —P, cyano, lower alkyl, lower alkoxy, lower alkoxyalkoxy, amino, lower alkylamino or lower alkylsulfonyl, at least one of —T¹, —T² and —T³ being the aforesaid —P; a pyridazine ring of the following general formula:

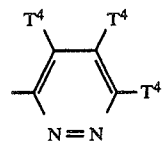

wherein —T⁴ represents fluorine or chlorine; etc.

Preferably, the aforesaid nitrogen-containing heterocyclic ring is the triazine ring of the above general formula [IX] or a pyrimidine ring of the following general formula:

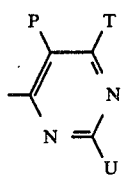

wherein —P is as defined above, —T represents —P or methyl, and —U represents —P or —SO₂CH₃.

In the group

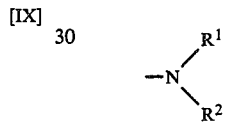

represented by —Q in the aforesaid general formula [IX], examples of the alkyl represented by —R¹ and —R² include methyl, ethyl and straight-chain or branched-chain alkyl of 3–18 carbon atoms, and examples of the substituted alkyl include alkyl substituted by cyano, hydroxy, lower alkoxy or dialkylamino, such as cyanomethyl, 2-cyanoethyl, 3-cyanopropyl, 2-hydroxyethyl, 2-hydroxypropyl, 3-hydroxypropyl, 4-hydroxybutyl, 2-(2-hydroxyethoxy)ethyl, tris(hydroxymethyl)methyl, 2-ethoxyethyl, 3-isopropoxypropyl, 3-(2-methoxyethoxy)propyl, 2,2-diethoxyethyl, 2-(N,N-diethylamino)ethyl, 2-(N,N-dimethylamino)ethyl, 3-(N,N-dimethylamino)propyl etc.

Examples of the alkenyl include allyl, 2-methylallyl, 3-methylallyl and straight-chain or branched-chain alkenyl of 4–18 carbon atoms, and examples of the substituted alkenyl include alkenyl substituted by cyano, hydroxy or lower alkoxy, such as 3-cyanoallyl, 2-hydroxyallyl, 3-methoxyethoxyallyl, 1-methyl-3-(N,N-diethylamino)allyl etc.

Examples of the aryl include phenyl, naphthyl, o-tolyl, p-butylphenyl etc., and examples of the aryl substituted by cyano, hydroxy, lower alkoxy or dialkylamino include m-cyanophenyl, p-hydroxyphenyl, p-methoxyphenyl, p-(2-methoxyethoxy)phenyl, 2,5-dimethoxyphenyl, p-(N,N-dimethylamino)phenyl etc.

Examples of the aralkyl include benzyl, phenetyl, m-methylbenzyl, p-methylphenetyl, etc., and examples of the substituted aralkyl include m-cyanobenzyl, p-hydroxybenzyl, p-hydroxyphenetyl, o-anisyl etc.

Examples of the nitrogen-containing heterocyclic ring represented by

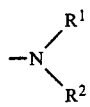

include 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl, 4-methyl-1-piperadinyl, 2,6-dimethyl-1-piperadinyl etc. As the

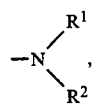

those in which the total number of carbon atoms present in —$R^1$ and —$R^2$ is up to 18 are preferred, more preferably disubstituted amino in which the total number of carbon atoms in —$R^1$ and —$R^2$ is 4–12, and most preferably dialkylamino.

The reactive pyridone azo dyestuffs of this invention may be produced by the following processes:

(a) Process for the production of the reactive pyridone azo dyestuffs of the following general formula [I-1]:

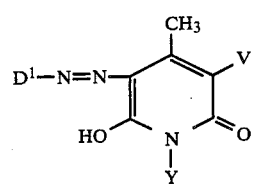

wherein $D^1$— represents

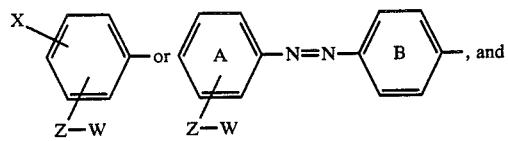

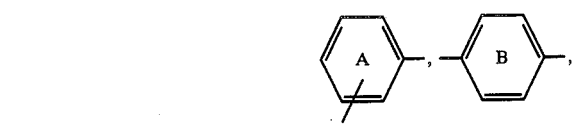

—V, —W, —X, —Y and —Z— are as defined above.

In an organic solvent in the presence of an acid-binding agent, an azo compound of the following general formula [I-2]:

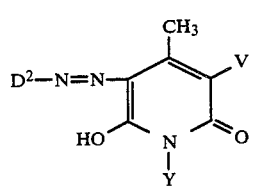

wherein $D^2$— represents

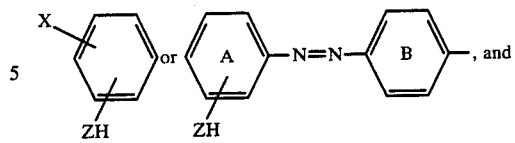

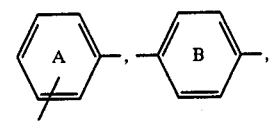

—V, —X, —Y and —Z— are as defined above and a heterocyclic compound of the following general formula [I-3]:

Hal—W  [I-3]

wherein Hal represents an active halogen atom and —W is as defined above are held or heated at 0°–90° C. for 0.5–5 hours. Thereafter, the resulting reaction mixture is cooled, and separated by, for example, pouring into water and separating the formed precipitates by filtration, centrifugation etc., thereby a reactive pyridone azo dyestuff of the above general formula [I-2] of this invention may be obtained.

(b) Process for the production of dyestuffs of the following general formula [I-4]:

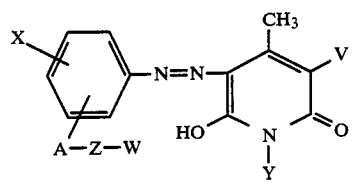

wherein —A—, —V, —W, —X, —Y and —Z— are as defined above.

In an organic solvent in the presence of an acid-binding agent, a monoazo compound of the following general formula [I-5:

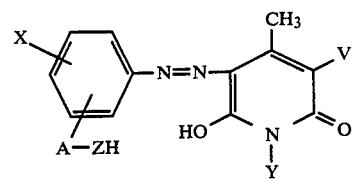

wherein —A—, —V, —X, —Y and —Z— are as defined above and a heterocyclic compound of the above general formula [I-3] are stirred together at −5° to 10° C. for 2–10 hours thereby a reactive pyridone azo dyestuff of the above general formula [I-4] may be produced.

(c) Process for the production of reactive pyridone azo dyestuffs of the following general formula [I-6]:

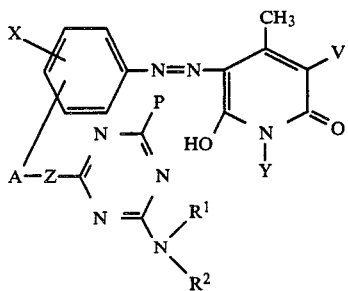

[I-6]

wherein —A—, —P, —V, —X, —Y and —Z— are as defined above.

In an organic solvent in the presence of an acid-binding agent, a monoazo compound of the above general formula [I-5] and a dihalogenotriazine of the following general formula [I-7]:

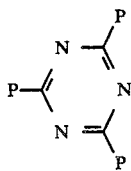

[I-7]

wherein —P is as defined above are stirred at −5° to 10° C. for 2-10 hours to obtain a monoazo compound of the following general formula [I-8]:

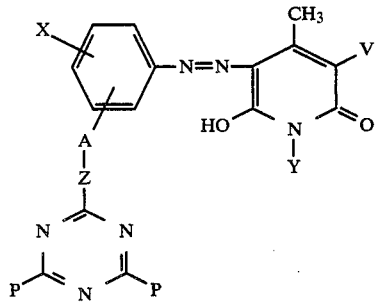

[I-8]

wherein —A—, —P, —V, —X, —Y and —Z— are as defined above. Thereafter, the obtained monoazo compound is stirred together with an amine of the following general formula [I-9]:

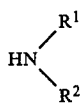

[I-9]

wherein —R$^1$ and —R$^2$ are as defined above in the presence of an acid-binding agent at −5° to 10° C. for 0.5-1 hour, thereby a reactive pyridone azo dyestuff of the general formula [I-6] may be produced.

Examples of the organic solvent which may be used in the above-described production processes include acetone, methyl ethyl ketone, toluene, nitrobenzene, dioxane, N,N-dimethylformamide, N-methyl-2-pyridone, dimethylsulfoxide etc., and examples of the acid-binding agent include tertiary amines such as triethylamine, N,N-diethylaniline etc. and inorganic bases such as potassium carbonate, potassium bicarbonate etc.

The amount of the acid-binding agent to be used may suitably be in the range of 1-2 molar times that of the azo compound of the general formula [I-2] or the monoazo compound of the general formula [I-5], and the amount of the heterocyclic compound of the general formula [I-3] or the dihalogenotriazine of the general formula [I-7] to be used may suitably be in the range of 1.0-1.2 molar times that of the azo compound of the general formula [I-2] or the monoazo compound of the general formula [I-5].

Examples of the fibers which can be dyed with the dyestuffs of the above general formula [I] include fibers such as cellulose (cotton), linen etc., viscose rayon, copper ammonia rayon etc., modified cellulose fibers which have been partially aminated or partially acylated, polyesters, polyamides, nylons, wool, silk, polyurethanes, diacetates, triacetates etc. as well as mixed spun cloths, mixed woven cloths, fabrics etc. produced therefrom (hereinafter referred to as fibers). Of those, the dyestuffs are particularly effective on the cellulose, mixed fibers of cellulose and polyesters, etc.

On practicing dyeing, it is desired that the dyestuff of the above general formula [I] be finely dispersed in a medium in a particle size of about 0.5-2μ. Suitable examples of the dispersing method include:

(1) a method which comprises finely dispersing in water by a grinder such as a sand grinder etc. using a water-soluble dispersing agent such as a nonionic surface active agent, e.g., a pluronic type surface active agent, or an anionic dispersing agent, e.g., sodium ligninsulfonate or a sodium salt of a naphthalenesulfonic acid-formaldehyde condensate, etc.;

(2) a method which comprises finely dispersing in a solvent other than water, e.g., alcohols, ketones, hydrocarbons, halogenated hydrocarbons, esters, ethers or mixed solvents thereof using a sulfosuccinic acid ester, an addition product of nonylphenol etc. and low moles of ethylene oxide, etc.;

(3) a method which comprises finely dispersing in a mixed system of water and a solvent freely compatible with water which is chosen from the above-described solvents; etc.

Further, in the above-described dispersing step, a polymer compound soluble in the particular dispersing medium chosen, a surface active agent having some major function other than the dispersing action, etc. may also be safely added.

The thus obtained fine dispersion of the dyestuff may be used as such as a padding bath in a dip dyeing method or in a pad dyeing method or as a color paste in a print dyeing method.

In general, the fine dispersion of the dyestuff produced as above is used as a dip dyeing bath, a padding bath or a printing paste by diluting to a desired concentration with water, an aqueous organic solvent etc. or as an O/W or W/O emulsion of a petroleum hydrocarbon, a halogenated hydrocarbon etc. and water.

On preparing a dip dyeing bath, a padding bath or a printing paste, it is possible to add an alkali metal compound, or an alkali precursor compound which will generate an alkali when heated in the presence of water as an acid-binding agent. Examples of the aforesaid alkali metal compound include, in addition to alkali metal carbonates, alkali metal bicarbonates, alkali metal phosphates, alkali metal borates, alkali metal silicates, alkali metal hydroxides and fatty acid alkali metal salts such as alkali metal acetates etc., and examples of the alkali precursor compound which will generate an alkali when heated in the presence of water include sodium trichloroacetate, sodium acetoacetate etc.

The amount of those acid-binding agents to be used is generally satisfactorily such that the pH of the dip dyeing bath, padding bath or printing color paste be in the range of 7.5-9.0.

When fibers containing cellulose are to be dyed, it is preferred to make a cellulose fiber-swelling agent present in the dyeing bath or color paste.

Any compound may be used as the cellulose fiber-swelling agent so long as it has a boiling point of 150° C. or higher and has an effect to swell cellulose fibers. Examples thereof include ureas such as N,N,N',N'-tetramethylurea etc., polyhydric alcohols such as polyethylene glycol, polypropylene glycol etc., or derivatives thereof. Of those, derivatives of polyhydric alcohols such as polyethylene glycol, polypropylene glycol etc. having an average molecular weight of about 200-500 in which the hydroxyl groups at both terminals have been dimethylated or diacetylated so that they do not react with the reactive groups of the dyestuff are particularly preferred as the cellulose fiber-swelling agent.

The amount of the cellulose fiber-swelling agent to be used is suitably in the range of about 5-25% by weight, preferably in the range of about 8-15% by weight, based on the weight of the dyeing bath or color paste.

Dyeing of the aforesaid fibers using the dyestuffs of the above general formula [I] may be achieved by impregnating or printing a fiber material with the dyeing bath or printing color paste prepared in the conventional manner, e.g., by the above-described methods, then, after drying, heat-treating the material with hot air at 160°-220° C. or with superheated steam for 30 seconds to 10 minutes, or treating in a saturated steam at 100°-150° C. for 3-30 minutes, and finally washing with hot water containing a surface active agent, or washing in an O/W or W/O emulsion washing bath in which the oil layer is a halogenated hydrocarbon such as tetrachloroethylene etc., or washing by the conventional dry cleaning mode.

Dip dyeing using the dyestuffs of the above general formula [I] of this invention may be achieved by preparing a dip dyeing bath in the conventional manner and dyeing at a dyeing temperature of 80°-105° C. for 30-60 minutes.

The relationships between the preferred dyeing methods using the dyestuffs of the above general formula [I] of this invention and the fibers are illustrated in the following Table 1.

TABLE 1

| | Fibers | | | | |
|---|---|---|---|---|---|
| | Cellulosic | Polyamides | Polyester/Cellulose | Polyamide/Cellulose | Polyester/Wool |
| Dip Dyeing | Passable | Good | Passable | Passable | Good |
| Padding | Good | Good | Good | Good | Good |
| Printing | Good | Good | Good | Good | Good |

This invention is more particularly described by the following examples, but it will be understood that this invention is not limited to these examples.

EXAMPLE 1

A dyestuff dispersion was prepared by finely dispersing 15 g of a monoazo dyestuff of the following structural formula:

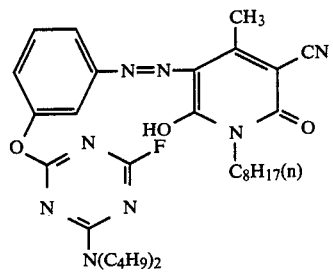

15 g of a naphthalenesulfonic acid-formaldehyde condensate and 70 ml of water using a paint shaker as a finely dispersing machine. Using this dyestuff dispersion, a printing color paste (pH 8.0) having the following composition:

| Dye dispersion | 6.5 g |
|---|---|
| 5% Sodium alginate aqueous solution | 55 g |
| Polyethylene glycol dimethyl ether, average molecular weight: 400 | 9 g |
| Water | balance |
| Total | 100 g | was prepared. A polyester/cotton (mixing ratio: 65/35) mixed spun cloth was print-dyed with the printing bath using a screen print dyeing machine. After provisionally drying at 80° C. for 3 minutes, the cloth was dry heated at 215° C. for 90 seconds to fix the paste. The cloth was then washed with water, and soaped with a detergent solution containing 2 g/l of a nonionic surface active agent ("Scourol #900", trademark, manufactured by Kao Soap Co., Ltd.) in a bath ratio of 1:30 at 80° C. for 20 minutes to obtain a yellow dyed product having excellent light fastness (grade 5). The washing fastness of said dyed product was also excellent (grade 5).

The dyestuff used in this Example 1 was synthesized by the following method.

3.82 g of a compound of the following structural formula:

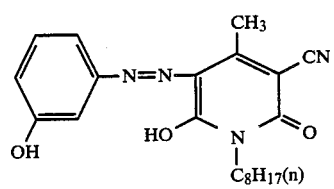

2.5 g of 2,4-difluoro-6-(di-n-butylamino)-triazine, 1.5 g of triethylamine and 1.0 g of potassium carbonate anhydride were added to 30 ml of acetone, reacted at reflux for 4 hours, poured into cold water, the resulting precipitates were filtered off, washed with water and dried at room temperature to obtain 5.5 g (yield 91%) of the dyestuff of Example 1 (yellow powder).

The maximum absorption wavelength, λmax (acetone) of this dyestuff was 427 nm.

EXAMPLE 2

A dyestuff dispersion was prepared by finely dispersing 16 g of a monoazo dyestuff of the following structural formula:

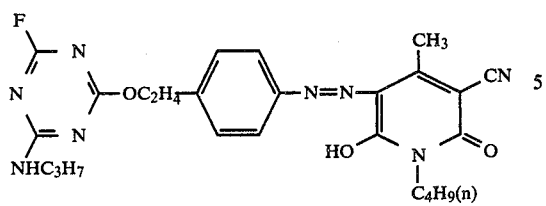

7 g of polyoxyethylene glycol nonyl phenyl ether (HLB 13.3), 3 g of a naphthalenesulfonic acid-formaldehyde condensate and 74 ml of water using a sand grinder. Using this dyestuff dispersion, a padding bath (pH 8.0) having the following composition:

| Dyestuff dispersion | 6 g |
|---|---|
| Tetraethylene glycol diethyl ether | 15 g |
| Water | balance |
| Total | 100 g | was prepared. A polyester/cotton (mixing ratio: 65/35) mixed spun cloth was impregnated with the padding bath, squeezed to a squeezing rate of 45%, then dried at 100° C. for 2 minutes and dry heated at 200° C. for one minute to fix. This cloth was washed with a hot ethanol bath to obtain a yellow dyed product having excellent light fastness (grade 5–6). The washing fastness of said dyed product was also excellent (grade 5).

The dyestuff used in this Example 2 was prepared by the following method.

3.5 g of a compound of the following structural formula:

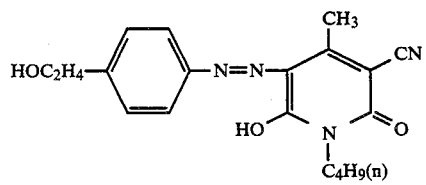

was dissolved in 30 ml of N-methylpyrrolidone, cooled to −5° C., and 1.6 g of 2,4,6-trifluorotriazine was added dropwise at the same temperature. After the addition, the reaction mixture was stirred at the same temperature for an hour, and thereafter 1.3 g of triethylamine and 0.7 g of propylamine were added dropwise at the same temperature. After completion of the addition, the reaction mixture was stirred for an hour, and poured into cold water. The separated precipitates were filtered off, and dried to obtain 4.1 g (yield 81%) of the dyestuff of Example 2.

The maximum absorption wavelength, λmax (acetone) of this dyestuff was 431 nm.

EXAMPLE 3

A dyestuff dispersion was prepared by finely dispersing 10 g of a monoazo dyestuff of the following structural formula:

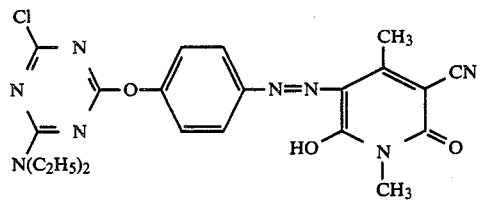

25 g of a naphthalenesulfonic acid-formaldehyde condensate and 65 ml of water using a sand grinder as a finely dispersing machine. Using this dyestuff dispersion, a dyeing bath (pH 8.0) having the following composition:

| Dyestuff dispersion | 2 g |
|---|---|
| Water | balance |
| Total | 300 g | was prepared. Nylon taffeta (10 g) was placed in the dyeing bath, which was gradually heated from room temperature to 95° C., and dyeing was effected at this temperature for an hour.

Thereafter, washing treatment was conducted according to the procedures described in Example 1 to obtain a yellow dyed product having excellent light fastness (grade 6). The dry cleaning fastness of said dyed product was also excellent (grade 5).

The dyestuff used in this Example 3 was synthesized from 2.84 g of a compound of the following structural formula:

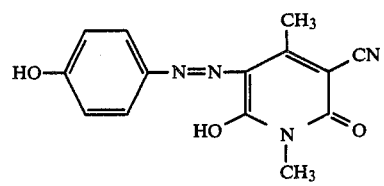

and 2.48 g of 2,4-dichloro-6-diethylaminotriazine according to the procedures described in Example 1.

The λmax (acetone) of this dyestuff was 433 nm.

EXAMPLE 4

A dyestuff dispersion was prepared by finely dispersing 15 g of a monoazo dyestuff of the following structural formula:

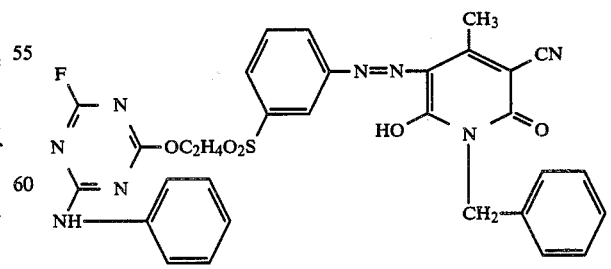

10 g of a Pluronic type surface active agent ("Pluronic L 64", trademark, manufactured by Asahi Electrochemical Industries, Ltd.) and 75 ml of water using a sand grinder as a finely dispersing machine. A printing color paste (pH 8.0) having the following composition:

| Dyestuff dispersion | 7 g |
|---|---|
| 5% Sodium alginate aqueous solution | 55 g |
| Diacetate of propylene glycol, average molecular weight: 300 | 10 g |
| Water | balance |
| Total | 100 g | was prepared. Mercerized cotton broad (40 counts) was printdyed with the printing color paste using a screen print dyeing machine. After provisionally drying at 80° C. for 3 minutes, the dyed cotton broad was treated with superheated steam at 185° C. for 7 minutes.

Thereafter, washing treatment was conducted according to the procedures described in Example 1 to obtain a yellow dyed product having excellent light fastness (grade 5). The washing fastness of said dyed product was also excellent (grade 4–5).

The dyestuff used in this Example 4 was synthesized according to the procedures described in Example 2.

The λmax (acetone) of this dyestuff was 422 nm.

EXAMPLE 5

A dyestuff dispersion was prepared by finely dispersing 10 g of a monoazo dyestuff of the following structural formula:

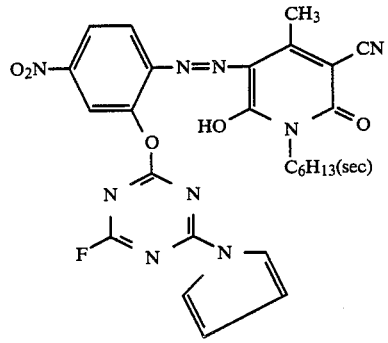

10 g of a naphthalenesulfonic acid-formaldehyde condensate and 80 ml of water using a paint shaker as a finely dispersing machine. Using this dyestuff dispersion, a printing color paste (pH 8.0) having the following composition:

| Dyestuff dispersion | 10 g |
|---|---|
| Triethylene glycol dimethyl ether | 40 g |
| 6% Sodium alginate aqueous solution | 550 g |
| Water | balance |
| Total | 1000 g | was prepared. A plyester/wool (mixing ratio: 80/20) mixed spun cloth was print dyed with this color paste using a screen print dyeing machine, provisionally dried at 80° C. for 3 minutes and thereafter treated with superheated steam at 180° C. for 6 minutes. This was then subjected to washing treatment according to the procedures described in Example 1 to obtain a uniformly dyed yellow product having excellent light fastness. The dry cleaning fastness of said dyed product was also excellent (grade 5).

The dyestuff used in this Example 5 was synthesized according to the procedures described in Example 1.

The λmax (acetone) of this dyestuff was 432 nm.

EXAMPLE 6

A dyestuff dispersion was prepared by finely dispersing 16 g of a monoazo dyestuff of the following structural formula:

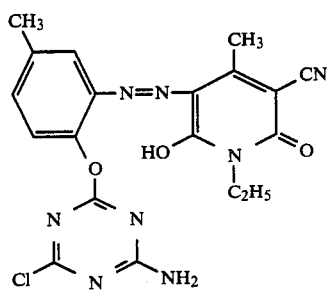

7 g of polyoxyethylene glycol nonyl phenyl ether (HLB 13.3), 3 g of a naphthalenesulfonic acid-formaldehyde condensate and 74 ml of water using a sand grinder. Using this dyestuff dispersion, a padding bath having the following composition:

| Dyestuff dispersion | 6 g |
|---|---|
| Water | balance |
| Total | 100 g | was prepared. A polyester fiber cloth was impregnated with this padding bath, squeezed to a squeezing rate of 45%, then dried at 100° C. for 2 minutes and dry heated in superheated steam at 185° C. for 7 minutes to fix. This cloth was reduction washed in the conventional manner to obtain a yellow dyed product having excellent fastness.

The λmax (acetone) of this dyestuff was 430 nm.

EXAMPLE 7

Polyester/cotton (65/35) mixed spun cloths were print-dyed using the monoazo dyestuffs set forth in Table 2 according to the procedures described in Example 1. The obtained dyed products had particularly excellent light fastness, and also had excellent wet color fastness without any stain in the white background.

Said monoazo dyestuffs were synthesized according to the procedures described in Example 1 or Example 2.

The hue of each dyed product and the λmax (acetone) of each dyestuff are shown in Table 2.

TABLE 2

General Formula

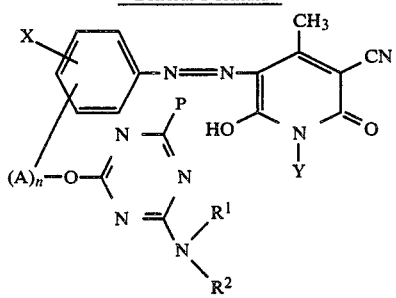

| No. | (A)$_n$—O— (X on ring) | —P / —N(R¹)(R²) | —Y | Hue of Dyed Cloth | λmax (Acetone) [nm] |
|---|---|---|---|---|---|
| 7-1 | 3-phenoxy (O— at meta) | —F, —N(C₂H₅)₅ | —CH₃ | Yellow | 427 |
| 7-2 | —OC₂H₄NH—O₂S—C₆H₄— | ", —NHC₂H₄OC₂H₅ | —CH₂CH₂CH₂OCH₃ | " | " |
| 7-3 | " | ", —N[C₅H₁₁(n)]₂ | —CH₂CH₂CN | " | " |
| 7-4 | o-CONHC₂H₄O—C₆H₄— | ", —N[C₃H₇(n)]₂ | —C₂H₅ | " | 425 |
| 7-5 | m-(—OH₄C₂NOC—)C₆H₄— | —Cl, —N(CH₃)(C₂H₄N(C₂H₅)₂) | —C₃H₇(i) | " | 429 |
| 7-6 | 2-Cl, 4-O— phenyl | —F, —NH—C₆H₅ | —C₅H₁₁(sec) | " | " |
| 7-7 | —OH₄C₂O—C₆H₄— (para) | ", —N(piperidine) | —C₂H₄OC₂H₄OCH₃ | " | 431 |
| 7-8 | " | —Cl, —N[C₃H₇(i)]₂ | —CH₂—C₆H₅ | " | " |
| 7-9 | " | —F, —N(C₂H₄OH)(CH₂C₆H₅) | —C₆H₁₃(n) | " | " |
| 7-10 | " | ", —NH₂ | —CH₃ | " | " |

TABLE 2-continued

General Formula

[Structure: X-substituted phenyl-N=N- attached to pyridone dye system with CH3, CN, HO, =O, N-Y substituents; linked via -P-N=C(N)-N(R¹)(R²) and (A)ₙ-O-C group]

| No. | X-phenyl-(A)ₙ-O- | -P, -N(R¹)(R²) | -Y | Hue of Dyed Cloth | λmax (Acetone) [nm] |
|---|---|---|---|---|---|
| 7-11 | 3-F, 4-(-O-) phenyl | ", -NH-cyclohexyl(H) | -C₉H₁₉(n) | " | 428 |
| 7-12 | 3-(CH₂O-)phenyl | ", -N(H)(2,6-diMe-piperidine) [-N with CH₃, H, CH₃] | -CH₂CH₂-(3-Cl-phenyl) | " | 430 |
| 7-13 | 4-Cl, 3-(CONHC₂H₄O-)phenyl | ", -N(H)-piperazine-NCH₃ | -CH₂CH₂O-phenyl | " | 427 |
| 7-14 | 2-CH₃, 5-(O-)phenyl | ", -N[C₂H₄N(CH₃)₂]₂ | -C₅H₁₁(sec) | " | 428 |
| 7-15 | 2-Cl, 4-(-OC₂H₄O-)phenyl | ", -NHC₂H₅ | -C₈H₁₇(iso) | " | " |
| 7-16 | 3-C₄H₉, 5-(O-)phenyl | " " | -CH₂-(3-CH₃-phenyl) | " | 426 |
| 7-17 | -OC₂H₄NHC(O)-phenyl- | ", -NH-phenyl | -C₄H₉(n) | " | 433 |
| 7-18 | " | ", -NHC₃H₇(n) | -CH₃ | " | " |
| 7-19 | " | -Cl, -NHC₄H₉(n) | -C₂H₄OCH₃ | " | " |

TABLE 2-continued

General Formula

| No. | X—⬡—(A)ₙ—O— | —P | —N⟨R¹/R² | —Y | Hue of Dyed Cloth | λmax (Acetone) [nm] |
|---|---|---|---|---|---|---|
| 7-20 | " | —F | —N($C_2H_4OH$)$_2$ | —$C_3H_7$(i) | " | " |
| 7-21 | " | " | —N⟨$C_3H_6OH$ / $C_3H_6CN$ | —$C_7H_{15}$(n) | " | " |
| 7-22 | " | " | —N($C_2H_5$)$_2$ | —$C_5H_{11}$(n) | " | " |
| 7-23 | 3-PhO— | " | —$NH_2$ | —$C_{10}H_{21}$(n) | " | 427 |
| 7-24 | " | " | —NH$C_{14}H_{29}$(sec) | —CH$_2$—Ph | " | " |
| 7-25 | " | " | —NH$C_2H_4$CN | —$C_2H_4OC_2H_5$ | " | " |
| 7-26 | " | " | —N($C_3H_6OCH_3$)$_2$ | —CH$_2$—O—Ph | " | " |
| 7-27 | 2-PhO— | —Cl | —N[$C_3H_7$(i)]$_2$ | —$C_5H_{11}$(n) | " | 430 |
| 7-28 | " | —F | —N(CH$_2$—CH=CH$_2$)$_2$ | —CH$_3$ | " | " |
| 7-29 | 3-($SO_2NH$—$C_2H_4O$)—Ph— | —Cl | —N[$C_4H_9$(sec)]$_2$ | —$C_4H_9$(sec) | " | 423 |
| 7-30 | " | —F | —N(CH$_3$)(Ph) | —$C_2H_5$ | " | " |
| 7-31 | " | " | —N[$C_6H_{13}$(n)]$_2$ | —$C_8H_{17}$(n) | " | " |
| 7-32 | " | " | —N[$C_4H_9$(n)]$_2$ | —$C_7H_{15}$(n) | " | " |
| 7-33 | " | " | " | —$C_2H_4OC_2H_4OCH_3$ | " | " |

TABLE 2-continued

General Formula $$\text{Structure with } X\text{-phenyl-N=N-pyridone core, } (A)_n\text{-O-C(P)=N-C(=N-NR}^1\text{R}^2\text{)-N, pyridone with CH}_3, CN, HO, =O, N-Y}$$

| No. | $\overset{X}{\underset{(A)_n-O-}{\text{phenyl}}}$ | —P | $-N\overset{R^1}{\underset{R^2}{}}$ | —Y | Hue of Dyed Cloth | λmax (Acetone) [nm] |
|---|---|---|---|---|---|---|
| 7-34 | 2-CH₃, 4-CH₃ phenyl-O— | " | " | —CH₂-(3-CH₃-phenyl) | " | 430 |
| 7-35 | " | " | " | —CH₂-(4-Cl-phenyl) | " | " |
| 7-36 | 2-O—, 4-NO₂ phenyl | " | —NHC₄H₉(n) | —C₃H₆OC₂H₅ | " | 442 |
| 7-37 | 2-O—, 4-Br, CH₃ phenyl | —Cl | —NH(CH₂)₈CH=CH(CH₂)₇CH₃ | —C₄H₉(n) | " | 425 |
| 7-38 | —OCH₂-(2-Cl-phenyl) | —F | —N(C₃H₆OC₂H₅)₂ | —CH₃ | " | 427 |
| 7-39 | —OH₄C₂NO₂S-(C₂H₅, H)-phenyl | " | —N[C₃H₇(n)]₂ | —C₂H₅ | " | 428 |
| 7-40 | 2-SO₂NHC₂H₄O— phenyl | " | " | —C₅H₁₁(n) | " | 429 |
| 7-41 | " | " | " | —C₆H₁₃(n) | " | " |

TABLE 2-continued

General Formula:

$$\text{(A)}_n-O-\underset{\underset{R^2}{\overset{R^1}{N}}}{\overset{N}{\underset{N}{C}}}-P-\text{Ar}(X)-N=N-\text{pyridone(CH}_3\text{,CN,HO,Y,O)}$$

| No. | (A)$_n$—O— (with X on Ar) | —P | —N(R$^1$)(R$^2$) | —Y | Hue of Dyed Cloth | λmax (Acetone) [nm] |
|---|---|---|---|---|---|---|
| 7-42 | " | " | —N[C$_9$H$_{19}$(n)]$_2$ | —CH$_2$CH$_2$—C$_6$H$_5$ | " | " |
| 7-43 | —OC$_2$H$_4$O$_2$S—C$_6$H$_4$— | " | —NHCH$_2$CH$_2$N(CH$_3$)$_2$ | —CH$_3$ | " | 421 |
| 7-44 | 3-CH$_3$-C$_6$H$_4$—O— | " | —N(C$_2$H$_5$)$_2$ | —C$_7$H$_{15}$(n) | " | 434 |
| 7-45 | " | " | —N(C$_2$H$_4$CN)$_2$ | —C$_5$H$_{11}$(n) | " | " |
| 7-46 | C$_6$H$_5$—O— | " | —N[C$_3$H$_7$(i)]$_2$ | —C$_{12}$H$_{25}$(n) | " | 427 |
| 7-47 | " | —Cl | —N[C$_4$H$_9$(sec)]$_2$ | —C$_{16}$H$_{33}$(n) | " | " |
| 7-48 | " | —F | —N(C$_2$H$_4$OCH$_3$)$_2$ | —C$_{18}$H$_{37}$(n) | " | " |
| 7-49 | —OC$_2$H$_4$NH—O$_2$S—C$_6$H$_4$— | " | —NHC$_3$H$_6$OCH$_3$ | —C$_{15}$H$_{31}$(sec) | " | " |
| 7-50 | 2-(CONHC$_2$H$_4$O—)C$_6$H$_4$— | " | —NH$_2$ | —C$_{18}$H$_{37}$(n) | " | 425 |
| 7-51 | 4-(C$_6$H$_5$—O—)C$_6$H$_4$— | " | —N[C$_3$H$_7$(n)]$_2$ | " | " | 433 |
| 7-52 | " | —Cl | —NH—C$_6$H$_5$ | —C$_{16}$H$_{33}$(n) | " | " |

TABLE 2-continued

General Formula

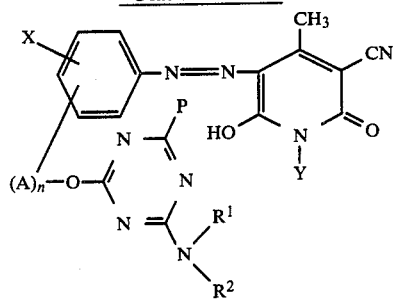

| No. | $\overset{X}{\underset{(A)_n-O-}{\bigotimes}}$ | —P | $-N\overset{R^1}{\underset{R^2}{\diagdown}}$ | —Y | Hue of Dyed Cloth | λmax (Acetone) [nm] |
|---|---|---|---|---|---|---|
| 7-53 | —OC₂H₄—⟨⟩— | —F | —NHC₃H₆OCH₃ | —C₁₂H₂₅(n) | " | 431 |
| 7-54 | " | " | —NH—⟨⟩—CH₃ | —C₁₅H₃₁(n) | " | " |
| 7-55 | " | " | —NHC₂H₄OC₂H₅ | —C₁₈H₃₇(n) | " | " |
| 7-56 | " | " | —N⌒NH O⌒ | " | " | " |
| 7-57 | " | —Cl | —N⌒NH N—CH₃⌒ | —C₁₃H₂₇(n) | " | " |
| 7-58 | ⟨⟩—O— | —Br | —N(C₂H₅)₂ | —C₈H₁₇(n) | " | 427 |

EXAMPLE 8

A dyestuff dispersion was prepared according to the procedures described in Example 1 except that 15 g of the monoazo dyestuff used in Example 1 was replaced by 15 g of a monoazo dyestuff of the following structural formula:

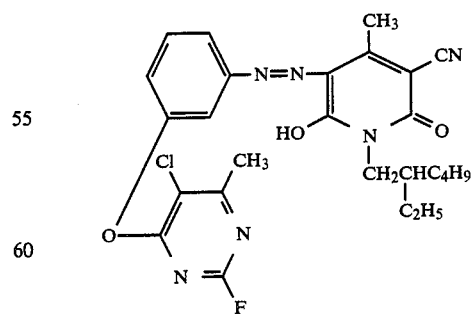

Using this dyestuff dispersion, a printing color paste (pH 9.0) having the following composition:

| | |
|---|---|
| Dyestuff dispersion | 6.5 g |

| | |
|---|---|
| 5% Sodium alginate aqueous solution | 55 g |
| CH$_3$O—(C$_2$H$_4$O)$_6$—H | 9 g |
| Water | 29.5 g |
| Total | 100 g | was prepared. Thereafter, a polyester/cotton (mixing ratio: 65/35) mixed spun cloth was dyed using the obtained printing color paste according to the procedures described in Example 1 to obtain a yellow dyed product having excellent light fastness. Said dyed product also had excellent wet color fastness without any stain in the white background.

The dyestuff used in this example was prepared by dissolving 3.82 g of a dyestuff of the following structural formula:

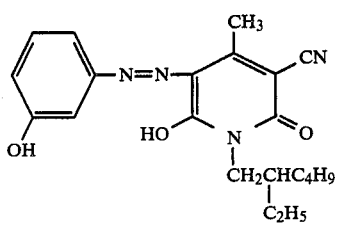

in 50 ml of N-methyl-2-pyrrolidone and 1.5 g of triethylamine, adding 2.0 g of 2,6-difluoro-4-methyl-5-chloropyrimidine, stirring at 40° C. for 2 hours to effect condensation, then adding dropwise the resulting reaction mixture to 500 ml of water, filtering off the separated precipitates, washing with water and drying in a reduced pressure dryer at room temperature to obtain 5.0 g (yield 96%) of the dyestuff of the above structural formula as a yellow powder.

The λmax (acetone) of this product was 428 nm.

EXAMPLE 9

A dyestuff dispersion was prepared and subsequently a padding bath (pH 9.0) was prepared according to the procedures described in Example 2 except that 16 g of the monoazo dyestuff used in Example 2 was replaced by 16 g of a monoazo dyestuff of the following structural formula:

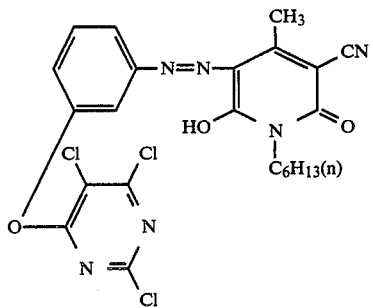

Thereafter, a polyester/cotton (mixing ratio: 65/35) mixed spun cloth was dyed using the obtained padding bath according to the procedures described in Example 2 to obtain a yellow dyed product having excellent light fastness. Said dyed product also had excellent wet color fastness.

The dyestuff used in this example was obtained by reacting a monoazo dyestuff of the following structural formula:

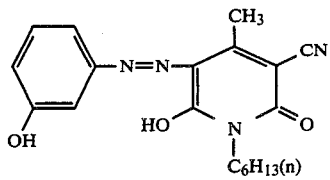

and 2,4,5,6-tetrachloropyrimidine in acetone in the presence of potassium carbonate anhydride as an acid-binding agent at 50° C. for 4 hours.

The λmax (acetone) of this product was 428 nm.

EXAMPLE 10

A dyestuff dispersion was prepared and subsequently a printing color paste (pH 9.0) was prepared according to the procedures described in Example 4 except that 15 g of the monoazo dyestuff used in Example 4 was replaced by 15 g of a monoazo dyestuff of the following structural formula:

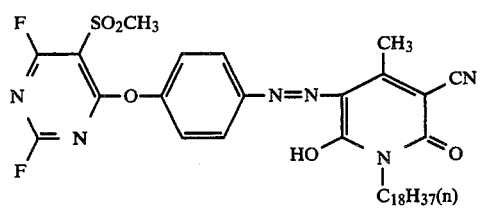

Thereafter, a mercerized cotton broad (40 counts) was dyed according to the procedures described in Example 4 to obtain a yellow dyed product having excellent light fastness. Said dyed product also had excellent wet color fastness.

The dyestuff used in this example was obtained by reacting a monoazo dyestuff of the following structural formula:

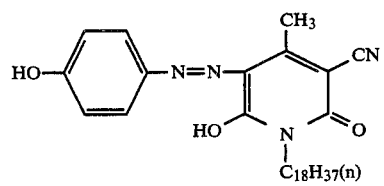

and 2,4,6-trifluoro-5-methylsulfonylpyrimidine in acetone in the presence of triethylamine anhydride as an acid-binding agent at 50° C. for 3 hours.

The λmax (acetone) of this product was 434 nm.

EXAMPLE 11

A dyestuff dispersion was prepared and subsequently a dyeing bath (pH 8.0) was prepared according to the procedures described in Example 3 except that 10 g of the monoazo dyestuff used in Example 3 was replaced by 10 g of a monoazo dyestuff of the following structural formula:

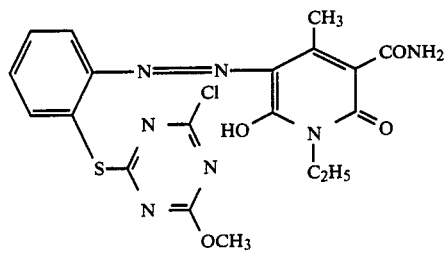

Thereafter, nylon taffeta was dyed according to the procedures described in Example 3 to obtain a yellow dyed product having excellent light fastness. Said dyed product also had excellent wet color fastness.

The dyestuff used in this example was obtained by reacting a monoazo dyestuff of the following structural formula:

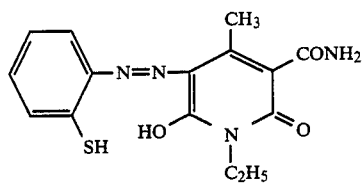

and 2,4-dichloro-6-methoxy-S-triazine in methyl ethyl ketone in the presence of potassium bicarbonate as an acid-binding agent at reflux for 3 hours.

The λmax (acetone) of this product was 422 nm.

EXAMPLE 12

A dyestuff dispersion was prepared and subsequently a printing color paste (pH 8.0) was prepared according to the procedures described in Example 5 except that 10 g of the monoazo dyestuff used in Example 5 was replaced by 10 g of a monoazo dyestuff of the following structural formula:

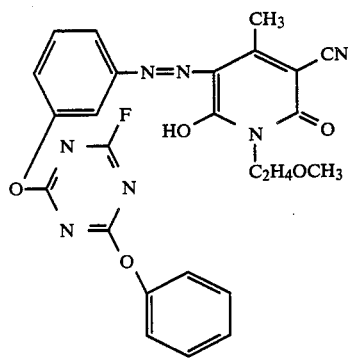

Thereafter, a polyester/wool (mixing ratio: 80/20) mixed spun cloth was dyed with the obtained printing color paste according to the procedures described in Example 5 to obtain a uniform yellow dyed product having excellent light fastness. Said dyed product also had excellent wet color fastness.

The dyestuff used in this example was obtained by condensing a monoazo dyestuff of the following structural formula:

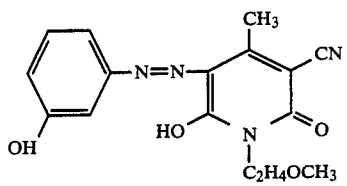

and 2,4-difluoro-6-phenoxy-S-triazine in N-methyl-2-pyrrolidone in the presence of triethylamine as an acid-binding agent at room temperature.

The λmax (acetone) of this product was 427 nm.

EXAMPLE 13

Using a dyestuff dispersion prepared according to the procedures described in Example 8, a padding bath (pH 8.0) having the following composition:

| Dyestuff dispersion | 50 g |
|---|---|
| CH$_3$O—(C$_2$H$_4$O)$_{15}$—H | 100 g |
| Water | 850 g |
| Total | 1000 g | was prepared. A nylon/rayon (mixing ratio: 50/50) mixed spun cloth was impregnated, squeezed to a squeezing rate of 60% provisionally dried at 100° C. for 2 minutes, and dry heated at 190° C. for 90 seconds to fix. This was then subjected to washing treatment according to the procedures described in Example 1 to obtain a uniform yellow dyed product having excellent light fastness. Said dyed product also had excellent wet color fastness.

EXAMPLE 14

The monoazo dyestuffs set forth in Table 3 were synthesized according to the procedures described in Example 8 or Example 9, and using these dyestuffs, polyester/cotton (65/35) mixed spun cloths were print-dyed according to the procedures described in Example 1.

The obtained dyed products had particularly excellent light fastness, and also had excellent wet color fastness without any stain in the white background.

The hue of each dyed product and the λmax (acetone) of each dyestuff are shown in Table 3.

TABLE 3

General Formula: (structure with X-substituted phenyl-N=N- connected to pyridone ring with CH3, V, HO, N-Y, and =O groups; Z-W substituent on phenyl)

| No. | X—(phenyl) | —Z— | —W | —V | —Y | Hue of Dyed Product | λmax (Acetone) [nm] |
|---|---|---|---|---|---|---|---|
| 14-1 | 2-Cl, 4-position | —O— | 4,6-dibromo-5-cyano-2-pyrimidinyl (NC, Br, Br on pyrimidine) | —CN | —C$_{12}$H$_{25}$(n) | Yellow | 429 |
| 14-2 | 2-C$_2$H$_5$, 4-position | " | 5-chloro-4,6-difluoro-2-pyrimidinyl (Cl, F, F) | " | —C$_7$H$_{15}$(n) | " | 428 |
| 14-3 | 3-C$_4$H$_9$, 5-position | " | 5,6-difluoro-2-(methylamino)-4-pyrimidinyl (F, F, NHCH$_3$) | " | —C$_2$H$_4$OC$_2$H$_4$OCH$_3$ | " | 427 |
| 14-4 | 3-methylphenyl | —O— | 5-cyano-6-fluoro-2-fluoro-4-pyrimidinyl (CN, F, F) | —CN | —C$_4$H$_9$ (sec) | " | 427 |
| 14-5 | " | " | 3,4,5-trichloro-pyridazinyl (Cl, Cl, Cl, N=N) | —CONH$_2$ | —C$_2$H$_5$ | " | 416 |
| 14-6 | 4-CF$_3$-phenyl | —S— | 4-fluoro-6-methyl-1,3,5-triazin-2-yl (F, CH$_3$) | —CN | —CH$_2$—C$_6$H$_5$ | " | 425 |
| 14-7 | 2-NO$_2$, 4-position | —O— | 5-fluoro-6-chloro-2-fluoro-4-pyrimidinyl (F, Cl, F) | " | —CH$_2$O—C$_6$H$_5$ | " | 441 |

TABLE 3-continued

General Formula:

$$\text{X}-\underset{Z-W}{\text{C}_6\text{H}_3}-N=N-\underset{\text{HO}}{\overset{\text{CH}_3}{\underset{|}{\text{C}}}}\text{pyridone-V,Y,O}$$

| No. | X-phenyl | —Z— | —W | —V | —Y | Hue of Dyed Product | λmax (Acetone) [nm] |
|---|---|---|---|---|---|---|---|
| 14-8 | C$_4$H$_9$O-(dimethylphenyl) | " | triazine with Cl and SCH$_3$ | " | —C$_3$H$_7$(i) | " | 438 |

EXAMPLE 15

The monoazo dyestuffs set forth in Table 4 were synthesized according to the procedures described in Example 8, and using these dyestuffs, polyester/cotton (65/35) mixed spun cloths were pad-dyed according to the procedures described in Example 2.

The obtained dyed product had excellent light fastness, and also had excellent wet color fastness.

The hue of each dyed product and the λmax (acetone) of each dyestuff are shown in Table 4.

TABLE 4

General Formula:

$$\text{X}-\underset{Z-W}{\text{C}_6\text{H}_3}-N=N-\underset{\text{HO}}{\overset{\text{CH}_3}{\underset{|}{\text{C}}}}\text{pyridone-V,Y,O}$$

| No. | X-phenyl | —Z— | —W | —V | —Y | Hue of Dyed Product | λmax (Acetone) nm |
|---|---|---|---|---|---|---|---|
| 15-1 | Br-phenyl | —O— | pyrimidine with Cl, CH$_3$, F | —CN | —C$_9$H$_{19}$(n) | Yellow | 428 |
| 15-2 | phenyl | " | pyrimidine with F, CH$_3$, SO$_2$CH$_3$ | —CONH$_2$ | —CH$_2$CH$_2$-(3-methylphenyl) | " | 416 |
| 15-3 | " | " | triazine with Br and OC$_4$H$_9$ | —CN | —CH$_2$-(2-methylphenyl) | " | 427 |

TABLE 4-continued

General Formula:

$$\text{X}\underset{Z-W}{\underset{|}{\bigcirc}}-N=N-\underset{HO}{\overset{CH_3}{\underset{|}{C}}}=\overset{V}{\underset{N-Y}{\underset{|}{C}}}=O$$

| No. | X—⟨⟩— | —Z— | —W | —V | —Y | Hue of Dyed Product | λmax (Acetone) nm |
|---|---|---|---|---|---|---|---|
| 15-4 | " | —S— | (triazine with F, Cl, CH₃) | " | —C₂H₄OCH₃ | " | 428 |
| 15-5 | C₃H₇(n)-substituted phenyl | —O— | (pyrimidine with SO₂CH₃, CH₃, F) | —CN | —C₁₂H₂₅(n) | " | 435 |
| 15-6 | Br-, CH₃-substituted phenyl | " | (pyrimidine with F, CH₃, F) | " | —C₇H₁₅(n) | " | 425 |
| 15-7 | methylphenyl | " | (triazine with Cl, CH₃, phenyl) | " | —CH₃ | " | 431 |
| 15-8 | " | " | (pyrimidine with F, F, CH₃, OC₂H₄OCH₃) | " | —C₂H₅ | " | 431 |

EXAMPLE 16

The monoazo dyestuffs set forth in Table 5 were synthesized according to the procedures described in Example 8, and using these dyestuffs, cotton was printdyed according to the procedures described in Example 4.

The obtained dye products had particularly excellent light fastness, and also had excellent wet color fastness without any stain in the white background.

The hue of each dyed product and the λmax (acetone) of each dyestuff are shown in Table 5.

TABLE 5

General Formula: (azo pyridone dye structure with substituents X, Z, W on aryl ring, V, Y on pyridone)

| No. | X–(aryl) | –Z– | –W | –V | –Y | Hue of Dyed Product | λmax (Acetone) nm |
|---|---|---|---|---|---|---|---|
| 16-1 | 4-F-phenyl | –O– | 4,5-difluoro-2-(isopropylamino)pyrimidin-6-yl | –CN | –C$_8$H$_{17}$(n) | Yellow | 424 |
| 16-2 | phenyl (3-substituted) | " | 4,6-dibromo-1,3,5-triazin-2-yl | " | –C$_2$H$_4$OC$_2$H$_4$OC$_2$H$_5$ | " | 428 |
| 16-3 | 2-methylphenyl | " | 3-methylsulfonyl-5,6-difluoropyrimidin-2-yl (SO$_2$CH$_3$ substituent) | –CONH$_2$ | –C$_3$H$_6$OC$_2$H$_5$ | " | 420 |
| 16-4 | 3-methoxyphenyl (OCH$_3$) | " | 4-fluoro-5-methyl-6-fluoropyrimidin-2-yl | –CN | –C$_4$H$_9$(n) | " | 436 |
| 16-5 | 2-ethylphenyl (C$_2$H$_5$) | –S– | 4-chloro-6-(2-chloroethylsulfonyl)-1,3,5-triazin-2-yl | " | –C$_6$H$_{13}$(n) | " | 432 |

EXAMPLE 17

The monoazo dyestuffs set forth in Table 6 were synthesized according to the procedures described in Example 8, and using these dyestuffs, nylon taffeta was dyed according to the procedures described in Example 3.

The obtained dyed products had particularly excellent light fastness, and also had excellent wet light fastness.

The hue of each dyed product and the λmax (acetone) of each dyestuff are shown in Table 6.

TABLE 6

General Formula

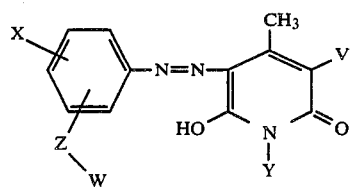

| No. | X / ring | —Z— | —W— | —V | Y | Hue of Dyed Product | λmax (Acetone) nm |
|---|---|---|---|---|---|---|---|
| 17-1 | 3-methylphenyl | —O— | 4,6-dimethyl-2-fluoro-1,3,5-triazinyl (F on triazine, with two CH₃) | —CN | —CH₂CH₂CN | Yellow | 427 |
| 17-2 | " | " | 4,6-dichloro-2-methyl-1,3,5-triazinyl | " | —CH₃ | " | " |
| 17-3 | " | " | 3,5,6-trichloropyridazinyl (N=N, three Cl) | " | —CH₂—C₆H₅ | " | " |
| 17-4 | " | " | 2,5,6-trichloro-4-methylpyrimidinyl | " | —CH₂CH₂—(3-Cl-C₆H₄) | " | " |
| 17-5 | 4-methylphenyl | " | 2,6-difluoro-5-chloro-4-methylpyrimidinyl | —CONH₂ | —CH₂CH(C₂H₅)C₄H₉ | " | 420 |
| 17-6 | 2-(n-C₃H₇)-4-methylphenyl | —S— | 5-chloro-6-fluoro-2-methylpyrimidinyl | —CN | " | " | 429 |
| 17-7 | 3-CH₃-4-methylphenyl | —O— | 5-bromo-2-(N(C₄H₉)₂)-pyrimidinyl | " | " | " | 428 |

TABLE 6-continued

General Formula

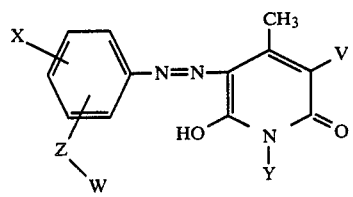

| No. | ![X/Z ring] | —Z— | —W | —V | Y | Hue of Dyed Product | λmax (Acetone) nm |
|---|---|---|---|---|---|---|---|
| 17-8 | " | " | Cl, CH₃ pyrimidine with F | " | " | " | 428 |

EXAMPLE 18

The monoazo dyestuffs set forth in Table 7 were synthesized according to the procedures described in Example 8, and using these dyestuffs, polyester/wool (80/20) mixed spun cloths were print-dyed according to the procedures described in Example 5.

The obtained dyed products had excellent light fastness, and also had excellent wet color fastness.

The hue of each dyed product and the λmax (acetone) of each dyestuff are shown in Table 7.

TABLE 7

General Formula

| No. | ![X ring] | —Z— | —W | —V | —Y | Hue of Dyed Product | λmax (Acetone) nm |
|---|---|---|---|---|---|---|---|
| 18-1 | (phenyl) | —O— | Cl, Cl, Cl triazine | —CN | —C₂H₅ | Yellow | 428 |
| 18-2 | " | " | F, NHC₃H₇ triazine | " | —C₁₈H₃₇(n) | " | " |
| 18-3 | " | " | F, Cl, CH₃ pyrimidine | " | —C₈H₁₇(n) | " | " |

TABLE 7-continued

General Formula:

[General formula structure showing: X-phenyl-N=N-pyridone with CH3, V, HO, Z-W, Y, O substituents]

| No. | X-phenyl (−Z− position) | −Z− | −W | −V | −Y | Hue of Dyed Product | λmax (Acetone) nm |
|-----|---|-----|----|----|----|---|---|
| 18-4 | [p-phenylene] | " | SO₂CH₃, CH₃ pyrimidine with F | " | −C₂H₄OC₂H₅ | " | 431 |
| 18-5 | [o-tolyl] | −S− | F, CH₃ pyrimidine with F | " | −C₃H₆OCH₃ | " | 430 |

EXAMPLE 19

The monoazo dyestuffs set forth in Table 8 were synthesized according to the procedures described in Example 8, and using these dyestuffs, nylon/rayon (mixing ratio: 50/50) mixed spun cloths were pad-dyed according to the procedures described in Example 13.

The obtained dyed products had excellent light fastness, and also had excellent wet color fastness.

The results are shown in Table 8.

TABLE 8

General Formula:

[General formula structure showing: X-phenyl-N=N-pyridone with CH3, V, HO, Z-W, Y, O substituents]

| No. | X-phenyl | −Z− | −W | −V | −Y | Hue of Dyed Product | λmax (Acetone) nm |
|-----|---|-----|----|----|----|---|---|
| 19-1 | [m-phenylene] | −S− | F, CH₃ pyrimidine with F | −CN | −C₈H₁₇(n) | Yellow | 428 |
| 19-2 | [m-tolyl] | −O− | F, N=N triazine with SC₃H₇ | " | −CH₃ | " | 427 |

TABLE 8-continued

General Formula

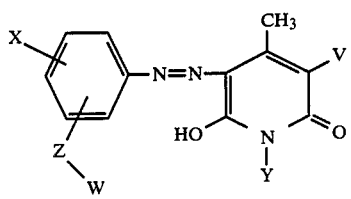

| No. | 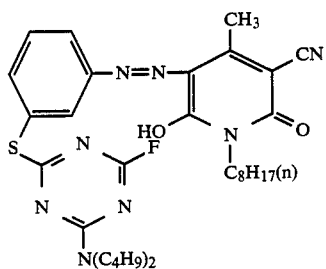 | —Z— | —W | —V | —Y | Hue of Dyed Product | λmax (Acetone) nm |
|---|---|---|---|---|---|---|---|
| 19-3 | 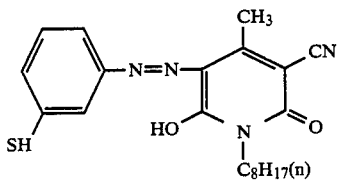 | " | F F $\overset{F}{\underset{N=N}{\diagdown}}$ F | —CONH$_2$ | —C$_2$H$_4$OC$_2$H$_5$ | " | 421 |

EXAMPLE 20

A dyestuff dispersion was prepared and subsequently a printing color paste (pH 8.0) was prepared according to the procedures described in Example 8 except that 15 g of the monoazo dyestuff used in Example 8 was replaced by 15 g of a monoazo dyestuff of the following structural formula:

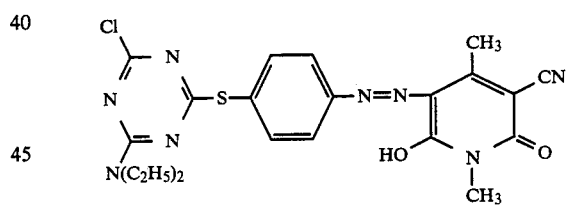

Thereafter, using the obtained printing color paste, a polyester/cotton (mixing ratio: 65/35) mixed spun cloth was dyed to obtain a yellow dyed product having excellent light fastness (grade 5). The washing fastness of said dyed product was also excellent (grade 5).

The dyestuff used in this example was synthesized by the following procedures.

3.98 g of a compound of the following structural formula:

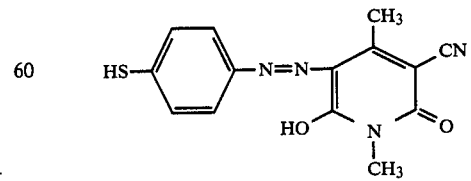

2.5 g of 2,4-difluoro-6-(di-n-butylamino)-triazine, 1.5 g of triethylamine and 1.0 g of potassium carbonate anhydride were added to 30 ml of acetone, reacted at reflux for 4 hours, then poured into cold water, the resulting precipitates were filtered off, washed with water and dried at room temperature to obtain 5.4 g (yield 87%) of the dyestuff of Example 20 as a yellow powder.

The maximum absorption wavelength λmax (acetone) of this dyestuff was 428 nm.

EXAMPLE 21

A dyestuff dispersion was prepared and subsequently a dyeing bath (pH 8.0) was prepared according to the procedures described in Example 3 except that 10 g of the monoazo dyestuff used in Example 3 was replaced by 10 g of a monoazo dyestuff of the following structural formula:

Using the obtained dyeing bath, nylon/taffeta was dyed according to the procedures described in Example 3 to obtain a yellow dyed product having excellent light fastness (grade 6). The dry cleaning fastness of said dyed product was also excellent (grade 5).

The dyestuff used in this example was synthesized from 3.0 g of a compound of the following structural formula:

and 2.48 g of 2,4-dichloro-6-diethylaminotriazine according to the procedures described in Example 20.

The λmax (acetone) of this dyestuff was 434 nm.

EXAMPLE 22

A dyestuff dispersion was prepared and subsequently a padding bath (pH 8.0) was prepared according to the procedures described in Example 2 except that 16 g of the monoazo dyestuff used in Example 2 was replaced by 16 g of a monoazo dyestuff of the following structural formula:

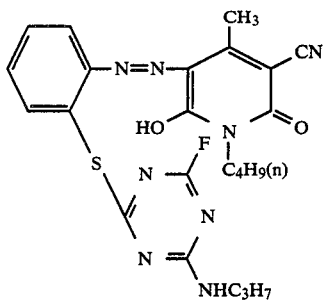

Thereafter, using the obtained padding bath, polyester/cotton (mixing ratio: 65/35) mixed spun cloth was dyed to obtain a yellow dyed product having excellent light fastness (grade 5). The washing fastness of said dyed product was also excellent (grade 5).

The dyestuff used in this example was synthesized from 3.28 g of a compound of the following structural formula:

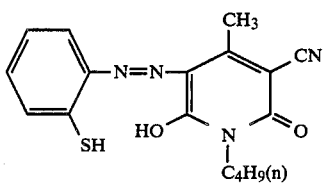

and 1.91 g of 2,4-difluoro-6-n-propylaminotriazine according to the procedures described in Example 20.

The λmax (acetone) of this dyestuff was 431 nm.

EXAMPLE 23

A dyestuff dispersion was prepared and subsequently a printing color paste (pH 8.0) was prepared according to the procedures described in Example 4 except that 15 g of the monoazo dyestuff used in Example 4 was replaced by 15 g of monoazo dyestuff of the following structural formula:

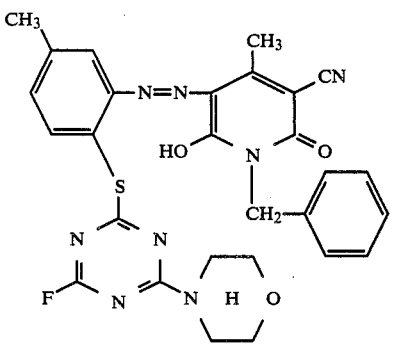

Thereafter, using the obtained printing color paste, mercerized cotton broad (40 counts) was dyed according to the procedures described in Example 4 to obtain a yellow dyed product having excellent light fastness (grade 5). The washing fastness of said dyed product was also excellent (grade 4–5).

The dyestuff used in this example was synthesized according to the procedures described in Example 20.

The λmax (acetone) of this dyestuff was 432 nm.

EXAMPLE 24

A dyestuff dispersion was prepared and a printing color paste (pH 8.0) was prepared according to Example 5 except that 10 g of the monoazo dyestuff used in Example 5 was replaced by 10 g of a monoazo dyestuff of the following structural formula:

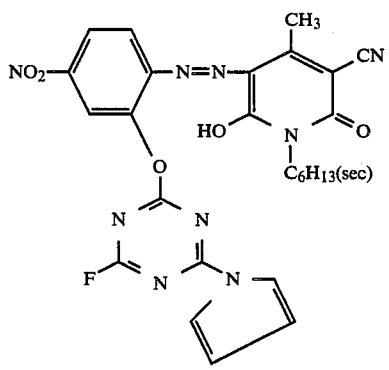

Thereafter, using the obtained printing color paste, a polyester/wool (mixing ratio: 80/20) mixed spun cloth was dyed according to the procedures described in Example 5 to obtain a uniformly dyed yellow dyed product having excellent light fastness. The dry cleaning fastness of said dyed product was also excellent (grade 5).

The dyestuff used in this example was synthesized according to the procedures described in Example 20.

The λmax (acetone) of this dyestuff was 432 nm.

EXAMPLE 25

A dyestuff dispersion was prepared and subsequently a padding bath was prepared according to the procedures described in Example 6 except that 16 g of the monoazo dyestuff used in Example 6 was replaced by 16 of a monoazo dyestuff of the following structural formula:

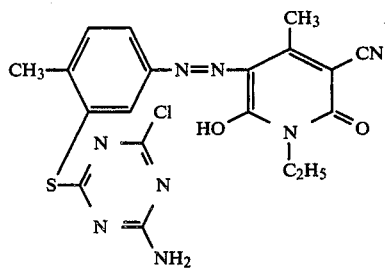

Thereafter, using the obtained padding bath, a polyester fiber cloth was dyed according to the procedures described in Example 6 to obtain a yellow dyed product having excellent light fastness.

The λmax (acetone) of this dyestuff was 430 nm.

EXAMPLE 26

Using the monoazo dyestuffs set forth in Table 9, polyester/cotton (65/35) mixed spun cloths were print-dyed according to the procedures described in Example 8. The obtained dyed products had particularly excellent light fastness. They also had excellent wet color fastness without any stain in the white background.

Said monoazo dyestuffs were synthesized according to the procedures of Example 20 or Example 21.

The hue of each dyed product and the λmax (acetone) of each dyestuff are shown in Table 9.

TABLE 9

General Formula

[Structure: X-substituted phenyl-N=N- linked to pyridone ring with CH₃, CN, HO, =O, N-Y substituents, and thiazole/amidine system with P, N-R¹R² groups]

| No. | X-aryl-S— | —P | —NR¹R² | —Y | Hue of Dyed Cloth | λmax (Acetone) nm |
|---|---|---|---|---|---|---|
| 26-1 | 3-(phenyl-S—) | —F | —N(C₃H₇(n))₂ | —C₈H₁₇(n) | Yellow | 431 |
| 26-2 | " | " | —N(CH₃)(phenyl) | —CH₂CH(C₂H₅)C₄H₉ | " | " |
| 26-3 | " | " | —N(CH₂—CH=CH₂)₂ | —CH₃ | " | " |
| 26-4 | " | " | —N(C₂H₅)₂ | —CH₂O-phenyl | " | " |
| 26-5 | " | " | piperidino (—N H) | —C₆H₁₃(n) | " | " |
| 26-6 | " | " | piperazino (—N H NC₂H₄OH) | —CH₂CH₂CN | " | " |
| 26-7 | " | —Cl | —N(CH₃)(C₂H₄N(C₂H₅)₂) | —CH₂CH₂-phenyl | " | 430 |
| 26-8 | 4-CH₃, 3-(S—)-phenyl | —F | 2,5-dimethylpyrrolidino (—N H with CH₃ groups) | —C₁₀H₂₁(n) | " | 432 |

TABLE 9-continued

General Formula

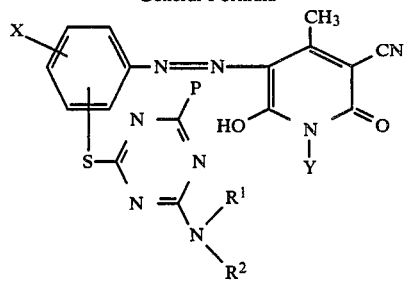

| No. | X-phenyl-S— | —P | —N(R¹)(R²) | —Y | Hue of Dyed Cloth | λmax (Acetone) nm |
|---|---|---|---|---|---|---|
| 26-9 | 2-Cl, 4-S-phenyl | " | —N[C$_2$H$_4$N(CH$_3$)$_2$]$_2$ | —C$_{18}$H$_{37}$(n) | " | 434 |
| 26-10 | 2-CH$_3$, 4-S-phenyl | " | —NH$_2$ | —C$_5$H$_{11}$(sec) | " | 430 |
| 26-11 | " | —Cl | —NH-phenyl | —CH$_2$CH$_2$-(3-Cl-phenyl) | " | " |
| 26-12 | 3-C$_4$H$_9$, 5-S-phenyl | —F | —NHC$_3$H$_7$(n) | —C$_{15}$H$_{31}$(n) | " | 433 |
| 26-13 | 2-S-phenyl | " | —N(C$_3$H$_7$(n))$_2$ | —CH$_2$CH$_2$CH$_2$OCH$_3$ | " | 431 |
| 26-14 | " | " | —N(C$_6$H$_{13}$(n))$_2$ | —C$_3$H$_7$(i) | " | " |
| 26-15 | 2-S, 4-CH$_3$-phenyl | " | —NHC$_2$H$_5$ | —C$_5$H$_{11}$(sec) | " | 432 |
| 26-16 | 4-Br, 2-S-phenyl | —Cl | —NHC$_2$H$_4$OC$_2$H$_5$ | —C$_{12}$H$_{25}$(n) | " | 427 |

EXAMPLE 27

A dyestuff dispersion was prepared and subsequently a printing color paste was prepared according to the procedures described in Example 1 except that 15 g of the monoazo dyestuff used in Example 1 was replaced by 15 g of a disazo dyestuff of the following structural formula:

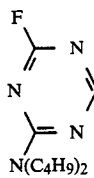

Thereafter, using the printing color paste, a polyester/cotton (mixing ratio: 65/35) mixed spun cloth was dyed according to the procedures described in Example 1 to obtain an orange dyed product having excellent light fastness (grade 5). The washing fastness of said dyed product was also excellent (grade 5).

The dyestuff used in this example was produced by the following procedures:

2.13 g of 4-amino-4'-hydroxyazobenzene was dissolved in 50 ml of a 50% (by volume) acetic acid aqueous solution and, after adding 3 ml of hydrochloric acid, cooled to 5° C. or below. Thereafter, 0.7 g of sodium nitrite was added. At that time, the temperature was maintained at 5° C. or below. The resulting diazonium salt solution was added to an aqueous solution of 1.64 g of 1-methyl-3-cyano-4-methyl-6-hydroxypyrid-2-one at 5° C. or below. The separated disazo compound was filtered off, washed with water and dried. 3.1 g of the obtained disazo compound, 2.15 g of 2,4-difluoro-6-(di-n-butylamino)triazine, 1.0 g of triethylamine and 0.6 g of potassium carbonate anhydride were added to 50 ml of acetone, and heated at reflux for 3 hours to effect a condensation reaction. The obtained reaction mixture was added dropwise to 1000 ml of ice water, the separated precipitates were filtered off, washed with water and dried at room temperature to obtain 4.16 g (orange powder, condensation yield 85%) of the dyestuff of the above structural formula.

The λmax (acetone) of this dyestuff was 460 nm.

EXAMPLE 28

A dyestuff dispersion was prepared and subsequently a padding bath (pH 8.0) was prepared according to the procedures described in Example 2 except that 16 g of the monoazo dyestuff used in Example 2 was replaced by 16 g of the disazo dyestuff of the following structural formula:

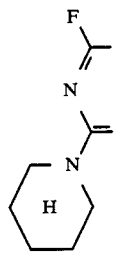

Thereafter, using the obtained padding bath, a polyester/cotton (mixing ratio: 65/35) mixed spun cloth was dyed according to the procedures described in Example 2 to obtain an orange dyed product having excellent light fastness (grade 5). The washing fastness of said dyed product was also excellent (grade 5).

The dyestuff used in this example was synthesized by diazotizing 3'-methyl-4'-amino-4-hydroxyazobenzene, coupling it with 1-(γ-methoxypropyl)-3-cyano-4-methyl-6-hydroxypyrid-2-one and reacting the resulting dye with 2,4-difluoro-6-piperidinotriazine according to the procedures described in Example 27.

The λmax (acetone) of this product was 463 nm.

EXAMPLE 29

A dyestuff dispersion was prepared and subsequently a dyeing bath (pH 8.0) was prepared according to the procedures described in Example 3 except that 10 g of the monoazo dyestuff used in Example 3 was replaced by 10 g of a disazo dyestuff of the following structural formula:

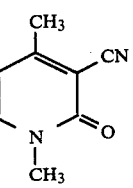

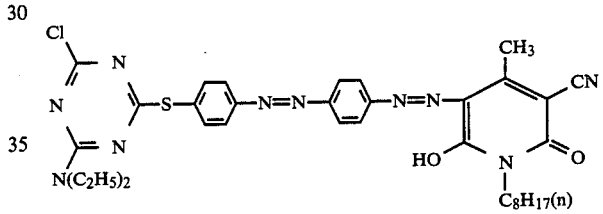

Thereafter, using the obtained dyeing bath, nylon taffeta was dyed according to the procedures described in Example 3 to obtain an orange dyed product having excellent light fastness (grade 5). The dry cleaning fastness of said dyed product was also excellent (grade 5).

The dyestuff used in this example was synthesized according to the procedures described in Example 27.

The λmax (acetone) of this dyestuff was 461 nm.

EXAMPLE 30

A dyestuff dispersion was prepared and subsequently a printing color paste (pH 8.0) was prepared according to the procedures described in Example 4 except that 15 g of the monoazo dyestuff used in Example 4 was replaced by 15 g of a disazo dyestuff of the following structural formula:

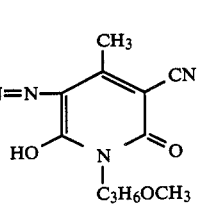

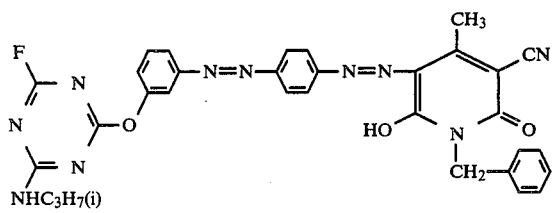

Thereafter, using the obtained printing color paste, mercerized cotton broad (40 counts) was dyed according to the procedures described in Example 4 to obtain an orange dyed product having excellent light fastness (grade 5). The washing fastness of said dyed product was also excellent (grade 4–5).

The dyestuff used in this example was synthesized according to the procedures described in Example 27.

The λmax (acetone) of this dyestuff was 457 nm.

EXAMPLE 31

A dyestuff dispersion was prepared and subsequently a printing color paste (pH 8.0) was prepared according to the procedures described in Example 5 except that 10 g of the monoazo dyestuff used in Example 5 was replaced by 10 g of a disazo dyestuff of the following structural formula:

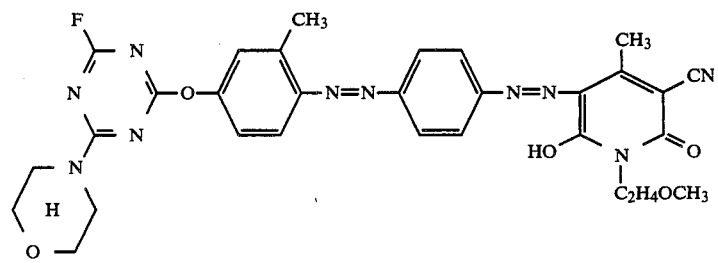

Thereafter, using the obtained printing color paste, a polyester/wool (mixing ratio: 80/20) mixed spun cloth was dyed according to the procedures described in Example 5 to obtain a uniformly dyed orange dyed product having excellent light fastness. The dry cleaning fastness of said dyed product was also excellent (grade 5).

The dyestuff used in this example was synthesized according to the procedures described in Example 27.

The λmax (acetone) of this dyestuff was 460 nm.

EXAMPLE 32

A dyestuff dispersion was prepared and subsequently a padding bath was prepared according to the procedures described in Example 6 except that 16 g of the monoazo dyestuff used in Example 6 was replaced by 16 g of a disazo dyestuff of the following structural formula:

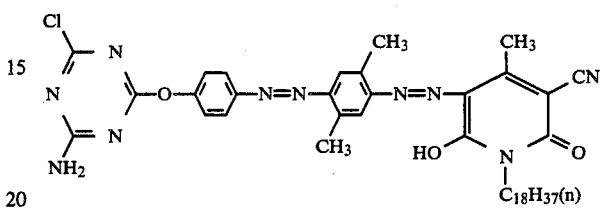

Thereafter, using the obtained padding bath, a polyester fiber cloth was dyed to obtain an orange dyed product.

The λmax (acetone) of this dyestuff was 466 nm.

EXAMPLE 33

Polyester/cotton (65/35) mixed spun cloths were print-dyed using the disazo dyestuffs set forth in Tables 10–12 according to the procedures described in Example 1. The obtained dyed products had particularly excellent light fastness, and also had excellent wet color fastness without any stain in the white background.

Said disazo dyestuffs were synthesized according to the procedures described in Example 27.

The hue of each dyed product and the λmax (acetone) of each dyestuff are shown in Tables 10–12.

TABLE 10

General Formula

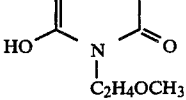

| No. | A | B | —Z— | —P | —NR¹R² | —Y | Hue of Dyed Cloth | λmax (Acetone) nm |
|---|---|---|---|---|---|---|---|---|
| 33-1 | phenyl | phenyl | —O— | —F | —NHCH₂—phenyl | —CH₃ | Orange | 460 |
| 33-2 | " | " | " | " | —N(C₂H₄OH)₂ | " | " | " |

TABLE 10-continued

General Formula

[Structure: P-substituted triazine with NR¹R² group, connected via Z to phenyl A, azo to phenyl B, azo to pyridone with CH₃, CN, OH, =O, and N-Y substituents]

| No. | A | B | —Z— | —P | —NR¹R² | —Y | Hue of Dyed Cloth | λmax (Acetone) nm |
|---|---|---|---|---|---|---|---|---|
| 33-3 | " | " | " | " | —N(piperidine with 3-CH₃, NH) | " | " | " |
| 33-4 | " | " | " | " | —N(C₃H₆CN)₂ | —CH₂CH₂CH₂OCH₃ | " | " |
| 33-5 | 2,5-disub phenyl with OC₂H₅ | " | " | —Cl | —N(C₂H₄OH)(CH₂CH=CH₂) | —C₃H₇(i) | " | 461 |
| 33-6 | p-phenylene | 2,4-disub phenyl with CH₃ | " | —F | —N(C₃H₇(n))₂ | —C₅H₁₁(sec) | " | 463 |
| 33-7 | " | phenyl with NHCOCH₃ | —S— | " | —NH₂ | —CH₂C₆H₅ | " | 465 |
| 33-8 | " | phenyl with OC₂H₅ | —O— | " | —N(C₉H₁₉(n))₂ | —C₈H₁₇(n) | " | " |
| 33-9 | " | phenyl with Cl | " | " | —NHC₁₄H₂₉(sec) | —CH₂CH₂O—C₆H₅ | " | 470 |
| 33-10 | phenyl with CH₃ | phenyl | " | " | —N(C₄H₉(sec))₂ | —C₅H₁₁(sec) | " | 462 |
| 33-11 | phenyl with Cl | " | " | " | —NH—C₆H₄(OCH₃) | —C₈H₁₇(iso) | " | 464 |
| 33-12 | " | " | " | " | —N(C₄H₉(iso))₂ | —C₂H₄OCH₃ | " | " |
| 33-13 | phenyl with Br | " | —S— | " | —N(thiomorpholine with S) | —C₃H₇(i) | " | 463 |
| 33-14 | phenyl with OCH₃ | " | —O— | " | —N(CH₃)(C₃H₆N(C₂H₅)₂) | —C₆H₅ | " | 461 |

TABLE 10-continued

General Formula (Structure: triazine with P, NR¹R², connected via Z to ring A, azo to ring B, azo to pyridone with CH₃, CN, OH, N-Y, =O)

| No. | A | B | —Z— | —P | —NR¹R² | —Y | Hue of Dyed Cloth | λmax (Acetone) nm |
|---|---|---|---|---|---|---|---|---|
| 33-15 | (p-phenylene) | 2,4-(CH₃)₂-phenylene | " | —Cl | morpholino (—N(CH₂CH₂)₂O with H) | —CH₂CH₂—C₆H₅ | " | 465 |
| 33-16 | " | 2-C₂H₅-phenylene | " | " | —N(C₂H₅)(C₂H₄—C₆H₄—CH₃) | —C₂H₄OC₂H₄OCH₃ | " | 463 |
| 33-17 | " | 2-CH₃, 4-NHCOCH₃-phenylene | " | —F | —N(C₂H₄CN)₂ | —CH₂—C₆H₄—Cl | " | 466 |
| 33-18 | " | 2,5-(OCH₃)₂-phenylene | " | " | —N(CH₃)(CH₂—CH=CH₂) | —C₁₈H₃₇(n) | " | 475 |

TABLE 11

General Formula (Structure: triazine with P, NR¹R², connected via Z to ring A (meta), azo to ring B (para), azo to pyridone with CH₃, CN, OH, N-Y, =O)

| No. | A | B | —Z— | —P | —NR¹R² | —Y | Hue of Dyed Cloth | λmax (Acetone) nm |
|---|---|---|---|---|---|---|---|---|
| 33-19 | (m-phenylene) | (p-phenylene) | —O— | —F | —N(CH₂CH₂OCH₃)₂ | —CH₃ | Orange | 458 |
| 33-20 | " | 4-OC₂H₅-phenylene | " | " | —NHC₁₈H₃₇(n) | " | " | 460 |
| 33-21 | " | " | " | " | —N(C₂H₄OC₂H₄OCH₃)₂ | " | " | " |

TABLE 11-continued

General Formula:

A structure with P-C(=N)-N-C(NR¹R²)=N-C(=N)-Z- connected to ring A, azo linked to ring B, azo linked to a pyridone (4-CH₃, 3-CN, 6-OH, 2-oxo, N-Y).

| No. | A | B | —Z— | —P | —NR¹R² | —Y | Hue of Dyed Cloth | λmax (Acetone) nm |
|---|---|---|---|---|---|---|---|---|
| 33-22 | " | " | " | —Cl | pyrrolidin-1-yl (—N in 5-ring with 2 double bonds) | —C₁₂H₂₅(n) | " | " |
| 33-23 | " | 2,5-dimethylphenyl (CH₃, CH₃) | —S— | —F | —N(CH₃)₂ | —C₂H₅ | " | 462 |
| 33-24 | phenyl (m-substituted) | 2,5-dimethylphenyl | —O— | " | —NHC₃H₇ | —CH₂—(3-methylphenyl) | " | 462 |
| 33-25 | 2,4-dimethylphenyl (CH₃, CH₃) | 2-methyl-5-NHCOCH₃-phenyl | " | " | piperidin-1-yl (—N⟨ ring with H labeled) | 3-chlorophenyl (—Cl) | " | 464 |
| 33-26 | " | " | " | " | —NH—cyclohexyl | —C₂H₄OC₂H₅ | " | " |
| 33-27 | 4-bromophenyl (Br) | 2,5-dimethylphenyl | " | " | 2,6-dimethylpiperidin-1-yl (—N with 2 CH₃) | —C₁₀H₂₁(n) | " | 463 |
| 33-28 | " | " | " | " | —N(C₅H₁₁(n))₂ | —CH₂O—phenyl | " | " |
| 33-29 | 2-OC₂H₅-4-methylphenyl | " | " | " | —N(C₆H₁₃(n))₂ | —C₃H₇(i) | " | 460 |

TABLE 11-continued
General Formula
| No. | A | B | —Z— | —P | —NR¹R² | —Y | Hue of Dyed Cloth | λmax (Acetone) nm |
|---|---|---|---|---|---|---|---|---|
| 33-30 | 2-Cl, 4-methyl phenyl | 2-CH₃, 5-OCH₃ phenyl | " | —Cl | —N(CH₃)(cyclohexyl) | —C₆H₁₃(n) | " | 465 |
TABLE 12
General Formula
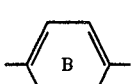
| No. | A | B | —Z— | —P | —NR¹R² | —Y | Hue of Dyed Cloth | λmax (Acetone) nm |
|---|---|---|---|---|---|---|---|---|
| 33-31 | phenyl | 2,5-di-CH₃ phenyl | —O— | —F | —N(C₂H₅)₂ | —CH₃ | Orange | 464 |
| 33-32 | " | " | " | " | —N(C₄H₉(iso))₂ | " | " | " |
| 33-33 | 4-CH₃ phenyl | phenyl | " | " | —N(C₂H₄CN)₂ | —C₁₆H₃₃(n) | " | 462 |
| 33-34 | " | 4-CH₃ phenyl | " | " | —NHCH₂CH₂N(CH₃)₂ | —C₇H₁₅(n) | " | 463 |

TABLE 12-continued

General Formula

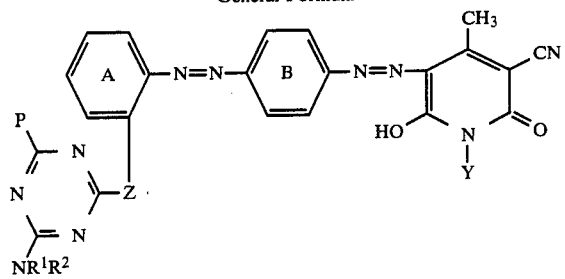

| No. | A | B | —Z— | —P | —NR¹R² | —Y | Hue of Dyed Cloth | λmax (Acetone) nm |
|---|---|---|---|---|---|---|---|---|
| 33-35 | Br (phenyl) | CH₃-phenyl | —S— | " | —N(C₄H₉(n))₂ | —CH₂CH₂OCH₃ | " | 465 |
| 33-36 | F (phenyl) | phenyl | " | —O— | —Cl, —N(CH₃)phenyl | —CH₂phenyl | " | 466 |
| 33-37 | OCH₃ (phenyl) | C₂H₅-phenyl | " | —F | —N(C₃H₆OH)₂ | —C₄H₉(n) | " | 465 |
| 33-38 | " | OCH₃-phenyl | " | " | piperazine N—C₂H₄OH | —CH₂CH₂CH₂OC₂H₅ | " | 466 |
| 33-39 | phenyl-phenyl | phenyl | " | —Br— | —N(C₄H₉)₂ | —CH₃ | " | 460 |

EXAMPLE 34

A dyestuff dispersion was prepared and subsequently a printing color paste (pH 9.0) was prepared according to the procedures described in Example 1 except that 15 g of the monoazo dyestuff used in Example 5 was replaced by 15 g of the disazo dyestuff of the following structural formula:

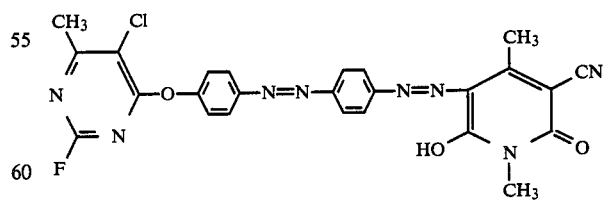

Thereafter, using the obtained printing color paste, a polyester/cotton (mixing ratio: 65/35) mixed spun cloth was dyed according to the procedures described in Example 1 to obtain an orange dyed product having excellent light fastness. The wet color fastness of said dyed product was also excellent.

The dyestuff used in this example was synthesized by the following procedures:

3.88 g of a disazo compound of the following structural formula:

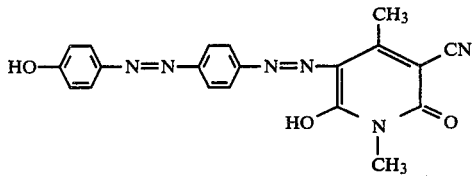

was dissolved in 50 ml of N-methyl-2-pyrrolidone and, after adding 2.0 g of 2,4-difluoro-5-chloro-6-methylpyrimidine as a heterocyclic compound, stirred at 40° C. for 2 hours to effect a condensation reaction. The resulting reaction mixture was added dropwise to 500 ml of water, the separated precipitates were filtered off, washed with water and dried in a reduced pressure drier at room temperature to obtain 5.1 g (yield 96%) of a powder of the dyestuff of the above structural formula: The λmax (acetone) of this dyestuff was 460 nm.

EXAMPLE 35

A dyestuff dispersion was prepared and subsequently a padding bath was prepared according to the procedures described in Example 2 except that 16 g of the monoazo dyestuff used in Example 2 was replaced by 16 g of a disazo dyestuff of the following structural formula:

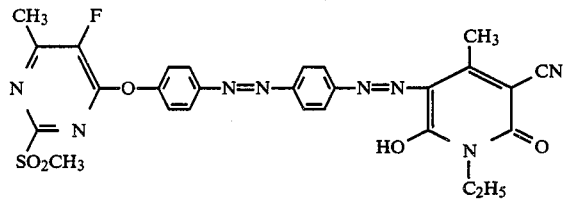

Thereafter, using the obtained padding bath, a polyester/cotton (mixing ratio: 65/35) mixed spun cloth was dyed to obtain an orange dyed product having excellent light fastness. The wet color fastness of said dyed product was also excellent.

The dyestuff used in this example was produced by reacting a disazo compound of the following formula:

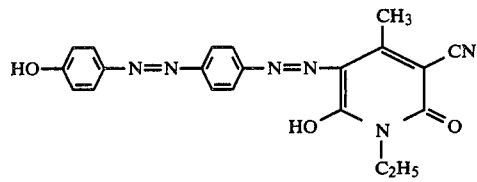

with 2-methylsulfonyl-4,5-difluoro-6-methylpyrimidine as a heterocyclic compound using triethylamine and potassium carbonate as acid-binding agents in acetone at 50° C. for 3 hours. The λmax (acetone) of this product was 461 nm.

EXAMPLE 36

A dyestuff dispersion was prepared and subsequently a printing color paste (pH 9.0) was prepared according to the procedures described in Example 4 except that 15 g of the monoazo dyestuff used in Example 4 was replaced by 15 g of a disazo dyestuff of the following structural formula:

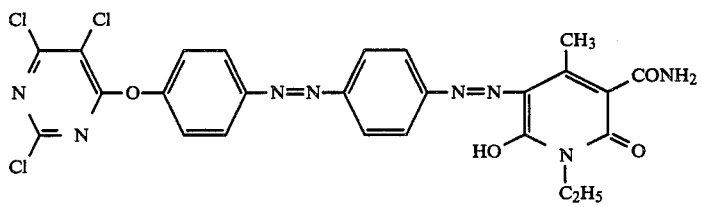

Thereafter, using the obtained printing color paste, mercerized cotton broad (40 counts) was dyed to obtain a yellowish orange dyed product having excellent light fastness. The wet color fastness of said dyed product was also excellent.

The dyestuff used in this example was produced by reacting a disazo compound of the following structural formula:

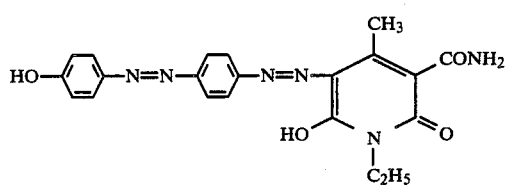

with 2,4,5,6-tetrachloropyridine (heterocyclic compound) using triethylamine as an acid-binding agent in acetone at reflux for 5 hours. The λmax (acetone) of this product was 450 nm.

EXAMPLE 37

A dyestuff dispersion was prepared and subsequently a dyeing bath was prepared according to the procedures described in Example 3 except that 10 g of the monoazo dyestuff used in Example 3 was replaced by 10 g of a disazo dyestuff of the following structural formula:

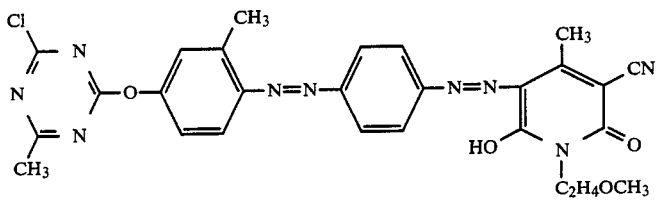

Thereafter, using the obtained dyeing bath, nylon taffeta was dyed according to the procedures described in Example 3 to obtain a reddish orange dyed product having excellent light fastness. The wet color fastness of said dyed product was also excellent.

The dyestuff used in this example was produced by reacting a disazo compound of the following formula:

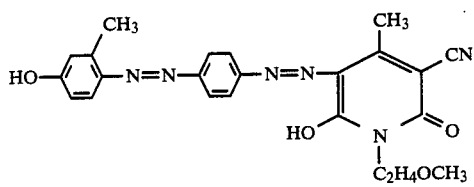

with 2,4-dichloro-6-methyl-S-triazine (heterocyclic compound) using triethylamine as an acid-binding agent in methyl ethyl ketone at 60° C. for 2 hours. The λmax (acetone) of this product was 461 nm.

EXAMPLE 38

A dyestuff dispersion was prepared and subsequently a printing color paste (pH 8.0) was prepared according to the procedures described in Example 5 except that 10 g of the monoazo dyestuff used in Example 5 was replaced by 10 g of a disazo dyestuff of the following structural formula:

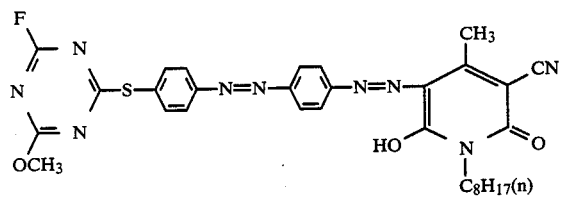

Thereafter, using the obtained printing color paste, a polyester/wool (mixing ratio: 80/20) mixed spun cloth was dyed according to the procedures described in Example 5 to obtain a uniform orange dyed product having excellent light fastness. The wet color fastness of said dyed product was also excellent.

The dyestuff used in this example was obtained by reacting a disazo dyestuff compound of the following formula:

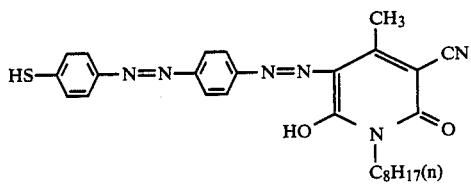

with 2,4-difluoro-6-methoxy-S-triazine using triethylamine as an acid-binding agent in acetone at reflux for 4 hours to effect condensation. The λmax (acetone) of this product was 461 nm.

EXAMPLE 39

Using the dyestuff dispersion of the disazo dyestuff described in Example 34, a padding bath (pH 8.0) having the following composition:

| | |
|---|---|
| Dyestuff dispersion | 50 g |
| Polyethylene glycol dimethyl ether, average molecular weight: 400 | 100 g |
| Water | 850 g |
| | 1000 g | was prepared. A nylon/rayon (mixing ratio: 50/50) mixed spun cloth was impregnated, squeezed to a squeezing rate of 60%, then provisionally dried at 100° C. for 2 minutes, and heat dried at 190° C. for 90 seconds to fix. This was then subjected to washing treatment according to the procedures described in Example 1 to obtain a uniform orange dyed product having excellent light fastness. The wet color fastness of said dyed product was also excellent.

EXAMPLE 40

The reactive pyridone disazo dyestuffs of this invention set forth in Table 13 were synthesized according to the procedures described in Example 34, and using these dyestuffs, polyester/cotton (mixing ratio: 65/35) mixed spun cloths were dyed according to the procedures described in Example 1.

The obtained dyed products had particularly excellent light fastness, and also had excellent wet color fastness without any stain in the white background.

The hue of each dyed product and the λmax (acetone) of each dyestuff are set forth in Table 13.

TABLE 13

General Formula (structure shown: Ar(A)-N=N-Ar(B)-N=N-C(pyridone) with substituents Z, W on ring A; pyridone bearing CH₃, V, OH, =O, N-Y)

| No. | A | B | —Z— | —W | —V | —Y | Hue of Dyed Cloth | λmax (Acetone) nm |
|---|---|---|---|---|---|---|---|---|
| 40-1 | phenyl | phenyl (p-) | —O— | Cl, CH₃ on fluoropyrimidine ring (2-F) | —CN | —C₆H₁₃(n) | Orange | 460 |
| 40-2 | " | " | " | CN, F on fluoropyrimidine (2-F) | " | —CH₂—C₆H₅ | " | 461 |
| 40-3 | " | " | " | Cl, CH₃ on dimethyltriazine | " | —CH₃ | " | 460 |
| 40-4 | " | 2-OC₂H₅-phenyl | —S— | Cl, Cl, Cl on trichloropyridazine (N=N) | " | " | " | 467 |
| 40-5 | 3-Cl-phenyl | 2-CH₃-phenyl | —O— | F, C₂H₅ on pyrimidine with SO₂CH₃ | —CONH₂ | —CH₂CH₂CH₂OCH₃ | Yellowish Orange | 453 |
| 40-6 | 3-methylphenyl | 3-CH₃, 4-NHCOCH₃-phenyl | " | CN, CH₃ on bromopyrimidine (2-Br) | —CN | —C₁₈H₃₇(n) | Orange | 468 |
| 40-7 | 2,4-(CH₃)-phenyl | 2-C₂H₅-phenyl | " | Cl, CH₃ on fluoropyrimidine (2-F) | " | —CH₂CH₂O—C₆H₅ | " | 464 |

TABLE 13-continued

General Formula:

[Structure: Z-W-A-N=N-B-N=N-pyridone(CH3, V, HO, N-Y, =O)]

| No. | A | B | —Z— | —W | —V | —Y | Hue of Dyed Cloth | λmax (Acetone) nm |
|---|---|---|---|---|---|---|---|---|
| 40-8 | phenyl (o-methyl) | 2,5-dimethylphenyl | " | fluoro-triazine-phenyl | " | —C$_2$H$_5$ | " | 465 |

EXAMPLE 41

The reactive pyridone disazo dyestuffs of this invention set forth in Table 14 were synthesized according to the procedures described in Example 34, and using these dyestuffs, polyester/cotton (65/35) mixed spun cloths were dyed according to the procedures described in Example 2.

The obtained dyed products had excellent light fastness and also excellent wet color fastness.

The hue of each dyed product and the λmax (acetone) of each dyestuff are shown in Table 14.

TABLE 14

General Formula:

[Structure: Z-W-A-N=N-B-N=N-pyridone(CH3, V, HO, N-Y, =O)]

| No. | A | B | —Z— | —W | —V | —Y | Hue of Dyed Cloth | λmax (Acetone) nm |
|---|---|---|---|---|---|---|---|---|
| 41-1 | phenyl | phenyl | —O— | trichloropyridazinyl | —CN | —CH$_3$ | Orange | 460 |
| 41-2 | 4-methylphenyl | phenyl | " | dichlorotriazinyl | " | —C$_2$H$_4$O-phenyl | " | 461 |
| 41-3 | 3-methylphenyl | 2,5-diethylphenyl | —S— | chloro-methyl-(SO$_2$CH$_3$)-pyrimidinyl | —CONH$_2$ | —C$_7$H$_{15}$(n) | Yellowish Orange | 456 |

EXAMPLE 42

The reactive pyridone disazo dyestuffs of this invention set forth in Table 15 were synthesized according to the procedures described in Example 34, and using these dyestuffs, cotton was print-dyed according to the procedures described in Example 4.

The obtained dyed products had particularly excellent light fastness. Said dyed products also had excellent wet color fastness without any stain in the white background.

The hue of each dyed product and the λmax (acetone) of each dyestuff are shown in Table 15.

TABLE 15

General Formula

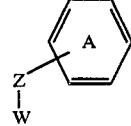

| No. | —A— | —B— | —Z— | —W | —V | —Y | Hue of Dyed Cloth | λmax (Acetone) nm |
|---|---|---|---|---|---|---|---|---|
| 42-1 | 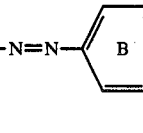 | 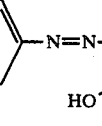 | —O— | 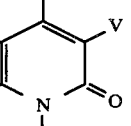 | —CN | —C$_{16}$H$_{33}$(n) | Orange | 461 |
| 42-2 | " | " | " |  | " | —C$_2$H$_5$ | " | " |
| 42-3 | " | " | " | 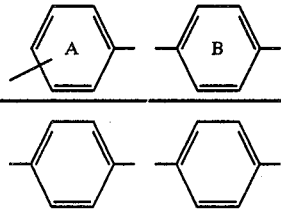 | —CONH$_2$ | " | Yellowish Orange | 450 |
| 42-4 | " | " | " | 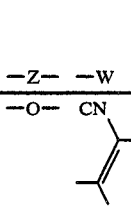 | —CN | " | Orange | 460 |
| 42-5 | 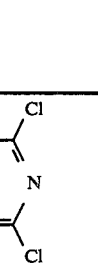 | 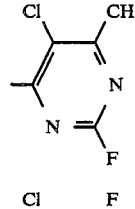 | —S— | 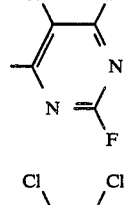 | —CN | —CH$_2$CH$_2$OCH$_3$ | " | 465 |
| 42-6 | 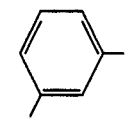 | 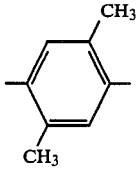 | —O— | 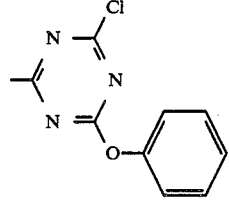 | —CN | 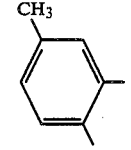 | " | 468 |

EXAMPLE 43

The reactive pyridone disazo dyestuffs of this invention set forth in Table 16 were synthesized according to the procedures described in Example 34, and using these dyestuffs, nylon taffeta was dyed according to the procedures described in Example 3.

The obtained dyed products had particularly excellent light fastness, and also had excellent wet color fastness.

The hue of each dyed product and the λmax (acetone) of each dyestuff are shown in Table 16.

TABLE 16

General Formula $$\text{Z-W-A-N=N-B-N=N-}\underset{\underset{Y}{N}}{\overset{\overset{CH_3}{\underset{}{}}}{\underset{HO}{\bigcirc}}}\text{-V=O}$$

| No. | —A— | —B— | —Z— | —W | —V | —Y | Hue of Dyed Cloth | λmax (Acetone) nm |
|---|---|---|---|---|---|---|---|---|
| 43-1 | phenyl | phenyl | —O— | difluoropyrimidinyl with OC$_2$H$_4$OCH$_3$ | —CN | —CH$_2$O-phenyl | Orange | 460 |
| 43-2 | " | " | —S— | chloromethylpyrimidinyl with SO$_2$CH$_3$ | " | —C$_3$H$_7$(i) | " | 461 |
| 43-3 | CF$_3$-phenyl | " | —O— | " | —CONH$_2$ | —C$_4$H$_9$(n) | Yellowish Orange | 457 |
| 43-4 | C$_4$H$_9$-phenyl | OC$_4$H$_9$(n)-phenyl | " | SO$_2$CH$_3$, F pyrimidinyl | —CN | —CH$_3$ | Orange | 469 |
| 43-5 | OC$_2$H$_5$-phenyl | C$_3$H$_7$(n)-phenyl | " | dichlorotriazinyl | " | —C$_2$H$_5$ | " | 464 |
| 43-6 | phenyl | C$_2$H$_5$, C$_2$H$_5$-phenyl | " | F, CH$_3$, F pyrimidinyl | " | —C$_2$H$_5$ | " | 467 |
| 43-7 | " | Cl-phenyl | " | F, Cl pyrimidinyl/triazinyl | " | phenyl | " | 469 |

TABLE 16-continued

General Formula

[Structure: A-ring—N=N—B-ring—N=N—pyridone with CH3, V, HO, N-Y, =O substituents; Z, W on A-ring]

| No. | A | B | —Z— | —W | —V | —Y | Hue of Dyed Cloth | λmax (Acetone) nm |
|---|---|---|---|---|---|---|---|---|
| 43-8 | 2-methylphenyl | 2,5-dimethyl-4-(NHCOCH3)-phenyl with C2H5 | " | (difluoro vinyl-pyrimidine with NHC3H7(i)) | " | —CH2—C6H5 | " | 466 |

EXAMPLE 44

The reactive pyridone disazo dyestuffs of this invention set forth in Table 17 were synthesized according to the procedures described in Example 34, and using these dyestuffs, polyester/wool (80/20) mixed spun cloths were print-dyed.

The obtained dyed products had particularly excellent light fastness, and also had excellent wet color fastness.

The hue of each dyed product and the λmax (acetone) of each dyestuff are shown in Table 17.

TABLE 17

General Formula

[Same general structure as above]

| No. | A | B | —Z— | —W | —V | —Y | Hue of Dyed Cloth | λmax (Acetone) nm |
|---|---|---|---|---|---|---|---|---|
| 44-1 | phenyl | phenyl | —O— | (fluoro-triazine with NHC2H4N(CH3)2) | —CN | —CH2CH2OCH3 | Orange | 461 |
| 44-2 | " | " | " | (chloro-methyl-fluoro-pyrimidine) | " | 3-methoxyphenyl (—OCH3) | " | 460 |
| 44-3 | " | " | " | (CN, F-substituted fluoro-pyrimidine) | —CONH2 | —C2H5 | Yellowish Orange | 450 |

TABLE 17-continued

General Formula:

Ar(A)–N=N–Ar(B)–N=N–C(pyridone with CH₃, V, OH, N-Y, =O)

Z–W substituent on ring A.

| No. | —(A)— | —(B)— | —Z— | —W | —V | —Y | Hue of Dyed Cloth | λmax (Acetone) nm |
|---|---|---|---|---|---|---|---|---|
| 44-4 | 2,5-disub phenyl with 4-CH₃ | 4-Cl-phenyl | —S— | 4,6-dichloro-1,3,5-triazin-2-yl (Cl, Cl on triazine) | —CN | —C₄H₉ | Orange | 463 |
| 44-5 | 2,5-disub phenyl with 4-C₂H₅ | 4-CH₃-phenyl | " | 4,6-dibromo-1,3,5-triazin-2-yl (Br, Br) | " | —CH₂—C₆H₅ | " | 464 |
| 44-6 | 3-CH₃-phenyl | 2-OCH₃-phenyl | " | 4-fluoro-6-(methylthio)-1,3,5-triazin-2-yl (F, SCH₃) | —CONH₂ | —C₃H₇(i) | " | 465 |

EXAMPLE 45

The reactive pyridone disazo dyestuffs of this invention set forth in Table 18 were synthesized according to the procedures described in Example 34, and using these dyestuffs, nylon/rayon (mixing ratio: 50/50) mixed spun cloths were pad-dyed according to the procedures described in Example 39.

The obtained dyed products had particularly excellent light fastness, and also had excellent wet color fastness.

The results are shown in Table 18.

TABLE 16

General Formula:

Ar(A)–N=N–Ar(B)–N=N–C(pyridone with CH₃, V, OH, N-Y, =O)

Z–W substituent on ring A.

| No. | —(A)— | —(B)— | —Z— | —W | —V | —Y | Hue of Dyed Cloth | λmax (Acetone) nm |
|---|---|---|---|---|---|---|---|---|
| 45-1 | phenyl | phenyl | —O— | 4-chloro-6-methyl-1,3,5-triazin-2-yl (Cl, CH₃) | —CN | —C₃H₇(i) | Orange | 460 |
| 45-2 | " | 3-Br-phenyl | " | 4,6-dichloro-1,3,5-triazin-2-yl with CN substituent (CN, Cl, Cl) | " | —CH₂—C₆H₄—Cl | " | 469 |

TABLE 16-continued

General Formula

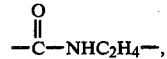

| No. | ⟨A⟩— | ⟨B⟩— | —Z— | —W | —V | —Y | Hue of Dyed Cloth | λmax (Acetone) nm |
|---|---|---|---|---|---|---|---|---|
| 45-3 | 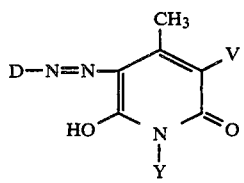 OCH₃ | NHCOCH₃ | " | (triazine with Cl, SC₂H₅) | " | —C₅H₁₁(n) | " | 465 |
| 45-4 | 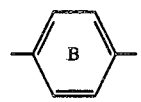 | 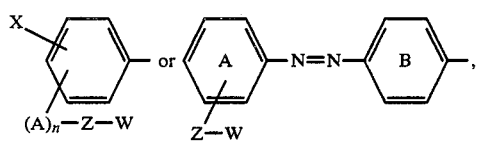 OCH₃, CH₃ | —S— | (pyrimidine with Cl, CH₃, SO₂CH₃) | —CONH₂ | —C₂H₅ | " | 466 |

What is claimed is:

1. A reactive pyridone azo dyestuff of the formula:

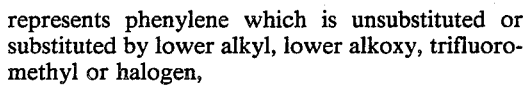

wherein

D represents

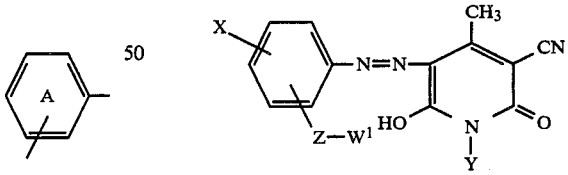

represents phenylene which is unsubstituted or substituted by lower alkyl, lower alkoxy, trifluoromethyl or halogen,

⟨B⟩ represents phenylene which is unsubstituted or substituted by lower alkyl, lower alkoxy, halogen or acetylamino, —A— represents —CH₂—, —C₂H₄—, —OC₂H₄—, $$-\overset{O}{\underset{\|}{C}}-NHC_2H_4-,$$

—SO₂NHC₂H₄— or —SO₂C₂H₄—,

—X represents hydrogen, lower alkyl, lower alkoxy, nitro, trifluoromethyl or halogen, —Y represents alkyl, aryl or aralkyl which are unsubstituted or substituted by lower alkoxy or phenoxy, —Z— represents a connecting group of —O— or —S—, —V represents —CN or —CONH₂, —W represents a 6-membered nitrogen-containing heterocyclic ring having at least one active halogen atom, and n represents 0 or 1.

2. The reactive pyridone azo dyestuff according to claim 1 which is of the formula:

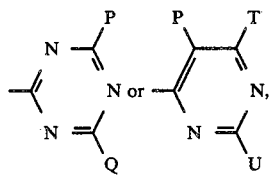

wherein

—W¹ represents

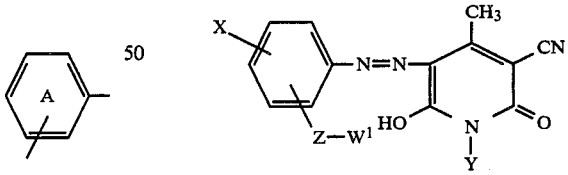

wherein

—P represents fluorine, chlorine or bromine,

—Q represents —P,

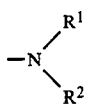

wherein —R¹ and —R² each represents hydrogen or alkyl, alkenyl, cyclohexyl, aryl or aralkyl which are unsubstituted or substituted by cyano, hydroxy, lower alkoxy or dialkylamino, or —NR¹R² represents a 5- or 6-membered nitrogen-containing heterocyclic ring formed by combining —R¹ and —R², the total carbon atoms present in —R¹ and —R² being up to 18, methyl, ethyl, phenyl, —O—R³ or —S—R³ wherein R³ represents methyl, ethyl, ethoxyethoxy or phenyl, —T represents —P or —CH₃,
—U represents —P or —SO₂CH₃, and
—X, —Y and —Z— are as defined above.

3. The reactive pyridone azo dyestuff according to claim 1 which is of the formula:

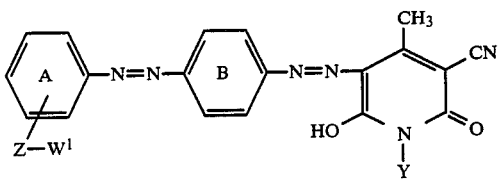

wherein

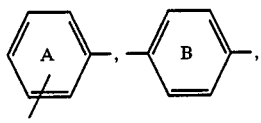

—Y, —Z— and —W¹ are as defined above.

4. The reactive pyridone azo dyestuff according to claim 1 which is of the formula:

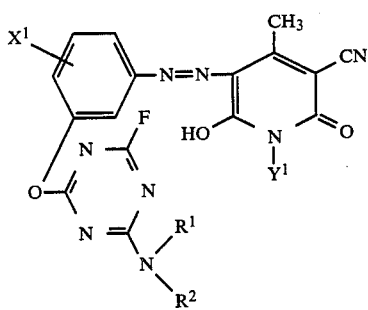

wherein —Y¹ represents alkyl optionally substituted by lower alkoxy, —X¹ represents hydrogen or lower alkyl, and —R¹ and —R² are as defined above.

5. The reactive pyridone azo dyestuff according to claim 1 which is of the formula:

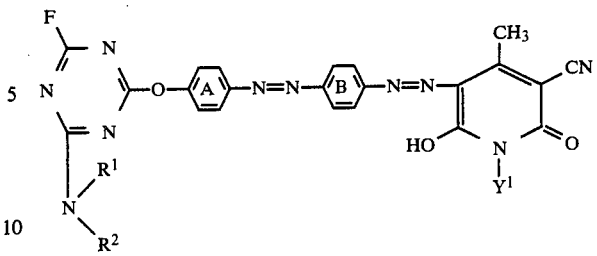

wherein

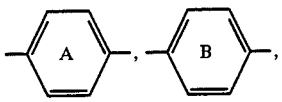

—Y¹, —R¹ and —R² are as defined above.

6. The reactive pyridone azo dyestuff according to claim 1 which is of the formula:

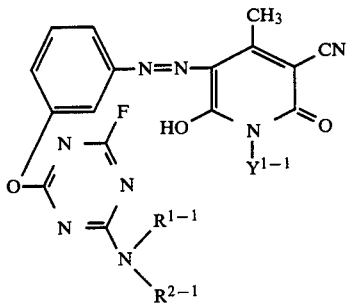

wherein —R¹⁻¹ and —R²⁻¹ each represents alkyl of 2-4 carbon atoms and —Y¹⁻¹ represents alkyl of 6-18 carbon atoms.

7. The reactive pyridone azo dyestuff according to claim 1 which is of the formula:

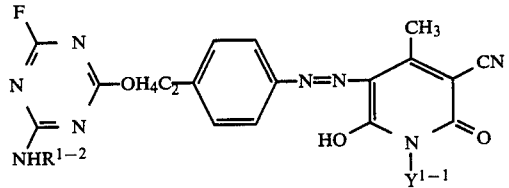

wherein —R¹⁻² represents alkyl of 2-4 carbon atoms and —Y¹⁻¹ is as defined above.

8. The reactive pyridone azo dyestuff according to claim 1 which is of the formula:

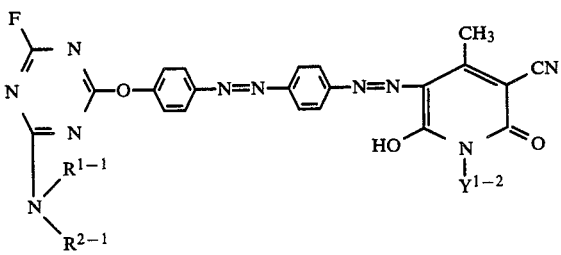

wherein —Y¹⁻² represents alkyl of 1-8 carbon atoms and —R¹⁻¹ and —R²⁻¹ are as defined above.

* * * * *